(12) United States Patent
Moosman et al.

(10) Patent No.: US 11,027,435 B2
(45) Date of Patent: Jun. 8, 2021

(54) AUTOMATED WORK PIECE TESTING SYSTEM AND METHOD FOR SAME

(71) Applicant: Raytheon Company, Waltham, MA (US)

(72) Inventors: Bryan R. Moosman, Tucson, AZ (US); Anthony R. Vulcano, Vail, AZ (US); Vonn L. Holyoak, Vail, AZ (US)

(73) Assignee: Raytheon Company, Waltham, MA (US)

( * ) Notice: Subject to any disclaimer, the term of this patent is extended or adjusted under 35 U.S.C. 154(b) by 142 days.

(21) Appl. No.: 16/209,556

(22) Filed: Dec. 4, 2018

(65) Prior Publication Data

US 2020/0171673 A1 Jun. 4, 2020

(51) Int. Cl.
*B25J 13/08* (2006.01)
*B25J 9/16* (2006.01)
*G01M 1/12* (2006.01)

(52) U.S. Cl.
CPC .......... *B25J 13/085* (2013.01); *B25J 9/1692* (2013.01); *B25J 13/089* (2013.01); *G01M 1/122* (2013.01)

(58) Field of Classification Search
CPC .................................. B25J 13/08; B25J 9/16
See application file for complete search history.

(56) References Cited

U.S. PATENT DOCUMENTS

| 3,320,795 A | 5/1967 | Monroe et al. |
| 3,992,933 A | 11/1976 | Randolph, Jr. |
| 4,161,876 A | 7/1979 | Carpenter |
| 4,213,330 A | 7/1980 | Brozel et al. |
| 4,705,999 A | 11/1987 | Soji et al. |

(Continued)

FOREIGN PATENT DOCUMENTS

| DE | 102014220085 A1 | 4/2016 |
| EP | 0937974 A2 | 8/1999 |

(Continued)

OTHER PUBLICATIONS

LLian Bonev "What is the workspace of a typical sis-axis industrial robot arm?"; 19 pages (Year: 2018).*

(Continued)

*Primary Examiner* — Kira Nguyen
(74) *Attorney, Agent, or Firm* — Schwegman Lundberg & Woessner, P.A.

(57) ABSTRACT

A method for identifying at least one physical characteristic of a work piece includes selecting at least one test scheme having one or more test configurations. At least one error isolation scheme is selected having one or more counterpart test configurations. The work piece is moved through the one or more test configurations, and a sensor suite measures one or more of base force, torque, or motion. The work piece is moved through the one or more counterpart test configurations, and counterpart force, torque or motion are measured. Identification of the at least one physical characteristic includes isolating error common to one or more of the measured base and counterpart force, torque or motion, and removing the isolated error from the base measurements to generate one or more of refined force, torque or motion. The at least one physical characteristic is determined according to the one or more refined values.

27 Claims, 18 Drawing Sheets

(56) References Cited

U.S. PATENT DOCUMENTS

| | | | |
|---|---|---|---|
| 5,081,865 | A | 1/1992 | Schechter et al. |
| 5,581,166 | A | 12/1996 | Eismann et al. |
| 5,737,500 | A | 4/1998 | Seraji et al. |
| 5,767,648 | A | 6/1998 | Morel et al. |
| 5,781,705 | A | 7/1998 | Endo |
| 5,789,890 | A | 8/1998 | Genov et al. |
| 5,811,951 | A | 9/1998 | Young |
| 6,023,645 | A | 2/2000 | Harima et al. |
| 6,121,743 | A | 9/2000 | Genov et al. |
| 7,765,023 | B2 | 7/2010 | Oaki et al. |
| 8,401,702 | B2 | 3/2013 | Okazaki et al. |
| 8,482,242 | B2 | 7/2013 | Nakasugi |
| 8,594,847 | B2 | 11/2013 | Schreiber et al. |
| 8,874,357 | B2 | 10/2014 | Wolfram et al. |
| 9,186,795 | B1 | 11/2015 | Edsinger et al. |
| 9,272,417 | B2 | 3/2016 | Konolige et al. |
| 9,272,743 | B2 | 3/2016 | Thielman et al. |
| 9,314,922 | B2 | 4/2016 | Dockter |
| 9,696,221 | B2 | 7/2017 | Lauzier et al. |
| 9,808,933 | B2 | 11/2017 | Lin et al. |
| 9,897,507 | B2 | 2/2018 | Vulcano |
| 10,369,702 | B2 | 8/2019 | Vulcano et al. |
| 10,709,512 | B2 | 7/2020 | Bajo et al. |
| 10,730,189 | B2 | 8/2020 | Kuroda et al. |
| 2005/0166413 | A1 | 8/2005 | Crampton |
| 2005/0246061 | A1 | 11/2005 | Oaki et al. |
| 2007/0021870 | A1 | 1/2007 | Nagasaka |
| 2007/0288124 | A1 | 12/2007 | Nagata et al. |
| 2009/0249750 | A1 | 10/2009 | Black et al. |
| 2011/0004343 | A1 | 1/2011 | Iida |
| 2011/0135437 | A1 | 6/2011 | Takeshita et al. |
| 2012/0010748 | A1 | 1/2012 | Sasai |
| 2012/0035763 | A1 | 2/2012 | Motoyoshi |
| 2012/0215357 | A1 | 8/2012 | Igarashi et al. |
| 2012/0215358 | A1 | 8/2012 | Gettings et al. |
| 2012/0277912 | A1 | 11/2012 | Kirihara |
| 2012/0324991 | A1 | 12/2012 | Goertz et al. |
| 2013/0190926 | A1 | 7/2013 | Motoyoshi et al. |
| 2013/0197792 | A1 | 8/2013 | Wolfram et al. |
| 2014/0031977 | A1 | 1/2014 | Goldenberg et al. |
| 2014/0046483 | A1 | 2/2014 | Oaki |
| 2014/0288703 | A1 | 9/2014 | Takagi |
| 2014/0316573 | A1 | 10/2014 | Iwatake |
| 2014/0331748 | A1* | 11/2014 | Watanabe ............. G01M 17/06 73/65.01 |
| 2014/0358280 | A1 | 12/2014 | Shinozaki |
| 2015/0114149 | A1 | 4/2015 | Gomi et al. |
| 2015/0120050 | A1 | 4/2015 | Gomi et al. |
| 2015/0127147 | A1 | 5/2015 | Yamazaki et al. |
| 2015/0328771 | A1 | 11/2015 | Yuelai |
| 2016/0305842 | A1 | 10/2016 | Vulcano |
| 2018/0003589 | A1* | 1/2018 | Akiyama ............. G01M 15/02 |
| 2018/0104825 | A1 | 4/2018 | Vulcano et al. |
| 2018/0133860 | A1* | 5/2018 | Fujita ..................... B23Q 17/22 |
| 2018/0169854 | A1 | 6/2018 | Shiratsuchi |
| 2018/0281186 | A1 | 10/2018 | Hiraide et al. |
| 2020/0171673 | A1* | 6/2020 | Moosman ............... G01M 1/10 |
| 2020/0171678 | A1 | 6/2020 | Holyoak et al. |

FOREIGN PATENT DOCUMENTS

| | | |
|---|---|---|
| EP | 2574896 A2 | 4/2013 |
| GB | 1470352 A | 4/1977 |
| JP | 0719982 A | 1/1995 |
| WO | WO-2018075525 A1 | 4/2018 |
| WO | WO-2020117674 A1 | 6/2020 |
| WO | WO-2020117746 A1 | 6/2020 |

OTHER PUBLICATIONS

"U.S. Appl. No. 14/689,125, Corrected Notice of Allowance dated Jan. 25, 2018", 2 pgs.

"U.S. Appl. No. 14/689,125, Non Final Office Action dated May 5, 2017", 8 pgs.

"U.S. Appl. No. 14/689,125, Notice of Allowance dated Sep. 5, 2017", 8 pgs.

"U.S. Appl. No. 14/689,125, Response filed Aug. 7, 2017 to Non-Final Office Action dated May 5, 2017", 11 pgs.

"U.S. Appl. No. 14/689,125, Response filed Dec. 5, 2017 to Examiner's Reason for Allowance dated Sep. 5, 2017", 1 pg.

"U.S. Appl. No. 15/406,944, Non Final Office Action dated Sep. 21, 2018", 27 pgs.

"International Application Serial No. PCT/US2017/056988, International Search Report dated Dec. 28, 2017", 2 pgs.

"International Application Serial No. PCT/US2017/056988, Written Opinion dated Dec. 28, 2017", 10 pgs.

Siouris, George, "The Generalized Missile Equations of Motion", Missile Guidance and Control Systems, Copyright Springer-Verlag New York, Inc., (2004), 15-51.

"U.S. Appl. No. 15/406,944, 312 Amendment filed Jun. 19, 2019", 10 pgs.

"International Application Serial No. PCT/US2017/056988, International Preliminary Report on Patentability dated May 2, 2019", 12 pgs.

"U.S. Appl. No. 15/406,944, Notice of Allowance dated Mar. 21, 2019", 8 pgs.

"U.S. Appl. No. 15/406,944, Response filed Jan. 22, 2019 to Non-Final Office Action dated Sep. 21, 2018", 19 pgs.

"U.S. Appl. No. 16/209,589, Non Final Office Action dated Nov. 27, 2020", 28 pgs.

"European Application Serial No. 17862064.7, Extended European Search Report dated May 18, 2020", 5 pgs.

"European Application Serial No. 17862064.7, Response filed Dec. 15, 2020 to Extended European Search Report dated May 18, 2020", 43 pgs.

"International Application Serial No. PCT/US2019/064008, International Search Report dated Mar. 16, 2020", 5 pgs.

"International Application Serial No. PCT/US2019/064008, Written Opinion dated Mar. 16, 2020", 7 pgs.

"International Application Serial No. PCT/US2019/064144, International Search Report dated Apr. 6, 2020", 4 pgs.

"International Application Serial No. PCT/US2019/064144, Written Opinion dated Apr. 6, 2020", 6 pgs.

Chirstopher, Atkeson, et al., "Rigid body load identification for manipulators", 24th IEEE Conference on Decision and Control, (Dec. 1, 1985), 996-1002.

Swevers, J, et al., "Dynamic Model Identification for Industrial Robots", IEEE Control Systems Magazine, IEEE Service Center, Piscataway, NJ, US, vol. 27, No. 5, (Oct. 1, 2007), 58-71.

"U.S. Appl. No. 16/209,589, Response filed Mar. 29, 2021 to Non Final Office Action dated Nov. 27, 2020", 24 pgs.

* cited by examiner

US 11,027,435 B2

AUTOMATED WORK PIECE TESTING SYSTEM AND METHOD FOR SAME

CROSS-REFERENCE TO RELATED PATENT DOCUMENTS

This patent application is related to U.S. Pat. No. 9,897,507 entitled "AUTOMATED WORK PIECE CENTER OF MASS IDENTIFICATION SYSTEM AND METHOD FOR SAME," filed on Apr. 17, 2015, which is hereby incorporated by reference herein in its entirety.

This patent application is related to U.S. patent application Ser. No. 15/406,944 entitled "AUTOMATED WORK PIECE MOMENT OF INERTIA IDENTIFICATION SYSTEM AND METHOD FOR SAME," filed on Jan. 16, 2017 and having a priority date of Oct. 17, 2016, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raytheon Company of Waltham, Mass. All Rights Reserved.

TECHNICAL FIELD

This document pertains generally, but not by way of limitation, to systems and methods for measuring one or more of weight, center of gravity or moment of inertia of a work piece.

BACKGROUND

Determining physical characteristics, such as center of mass, moment of inertia or the like, of discrete parts of an overall assembly (a work piece) is relatively straightforward with center of mass calculations including knowledge of the dimensions of the part (e.g., shape and size) and its mass. Determination of the physical characteristics, such as center of mass (CM or center of gravity, CG), moment of inertia (MOI) is more complex when parts are incorporated as a whole into an overall assembly. The overall assembly includes a variety of parts, in varying orientations, constructed with different materials that are coupled together. The assembly is difficult to model because of the various orientations and profiles of the parts and the varying materials. The center of mass, mass moments of inertia or the like of the assembly are used in the control of assemblies including launch vehicles and payloads (satellites and the like). For instance, the center of mass and mass moments of inertia are identified to ensure precise and predictable control including, but not limited to, control of pitch, yaw, roll and the like during launch, delivery and operation of a payload.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
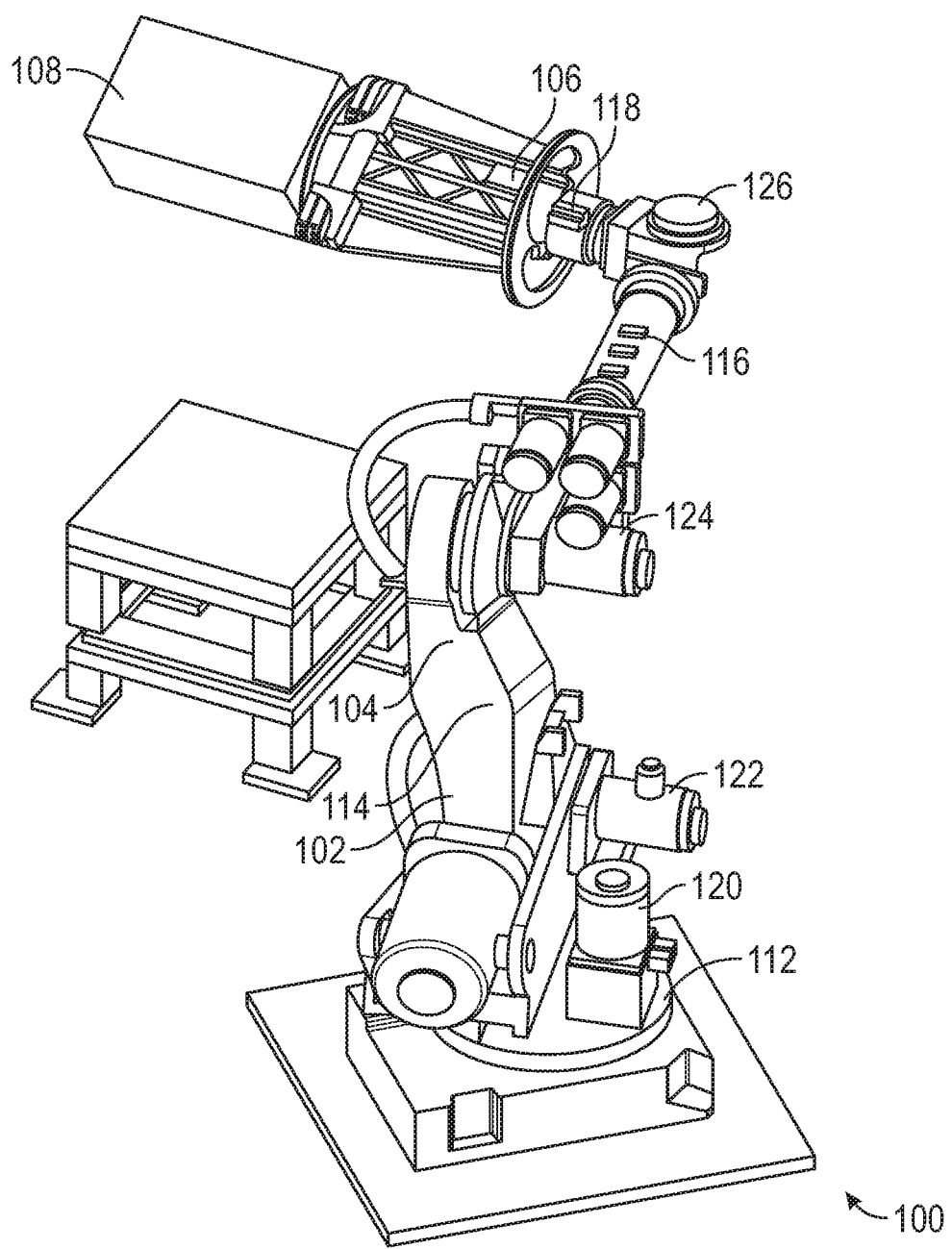
FIG. 1A is a perspective view of one example of a manipulation and testing system.

Load tables are used to measure center of mass (CM or center of gravity, CG) with assemblies having multiple component parts assembled together. The assembly is brought to a facility having a load table of sufficient size and capacity to carry the assembly (e.g., in some examples weighing thousands of pounds). One or more 'critical lifts' are performed to move the assembly from a fixture to the load table, orient and reorient the assembly on the load table, and then to move the assembly back to the original fixture. In one or more orientations the assembly is fixed to the table (e.g., bolted) to ensure the assembly remains in a particular orientation. Load cells measure the weight of the assembly. For instance, the load cells are spaced around the load table and measure portions of the assembly weight incident on the respective load cells. The measurements are used in combination with the relative location of the load cells to determine the assembly center of mass in two dimensions forming a plane parallel to the load table (e.g., X/Y, Y/Z or X/Z).

The assembly is then unbolted from the load table, and in another 'critical lift', reoriented relative to the first orientation to move the first plane, such as the X/Y plane, out of alignment to the load table. In this second orientation weight measurements are taken again and a second assembly center of mass is determined in the updated dimensions (e.g., Y/Z if the first plane was X/Y).

Optionally, additional characteristics, such as one or more moments of inertia (MOI) are determined with the assembly fixed to the table. The assembly and the table are rotated on a rotational air bearing to preload a calibrated torsion bar. The unit is released and begins to pendulum as torsional energy is released and stored in the torsion bar. The frequency of this oscillation is used to determine the MOI of the assembly. The assembly is then decoupled and optionally recoupled in a different orientation (adding at least one more 'critical lift'). The process is repeated to determine the MOI around the second axis. In another example, the reorientation (decoupling and recoupling) is conducted a third time to determine the MOI around another axis. In other examples, the process is repeated at 45-degree orientations relative to defined axes (e.g., Y, Z axes in the first three determinations) to determine the products of inertia (POI).

After the measurements are taken the assembly is unbolted from the load table, returned to a fixture with another 'critical lift' and returned for further production, testing or the like. The measurement of the center of mass in the various orientations is combined to identify the coordinates of the assembly center of mass. Additionally, the mechanical response in the various orientations (e.g., frequency of oscillation) is used to determine respective moments of inertia.

The present inventors have recognized, among other things, that a problem to be solved includes decreasing time and labor needed to accurately and repeatably identify physical characteristics of a work piece. Identification of characteristics, such as center of mass and moment of inertia, with load tables involves a relatively complex testing setup with a dedicated load table including an array of load cells. Additionally, the work piece (sometimes weighing hundreds or thousands of pounds) is moved with a plurality of 'critical lifts' to move the work piece to the table, orient the work piece, reorient the work piece for additional measurements and also return the work piece to a fixture for additional processing (e.g., assembly, installation or the like). Critical lifts are intensive time consuming events that require extensive documentation, checklists and review before each lift is conducted to ensure the work piece is not damaged. Accordingly, in some examples, identifying work piece physical characteristics is a full day process (20 hours or more) from the first critical lift, testing in various orientations each using a critical lift, and the last critical lift to the original fixture. Further, removal of the work piece from production to identify physical characteristics extends overall production time and requires significant additional labor.

In an example, the present subject matter provides a solution to these problems, such as by automatically identifying one or more work piece physical characteristics with a manipulator assembly configured to measure one or more of force, torque or motion of the work piece. The manipulator assembly orients the work piece in at least two different orientations relative to a reference force (e.g., gravity in one example) and measures at least one of force or torque incident on a force and torque sensor or the motion response of the work piece (e.g., rotation, rotational velocity or rotational acceleration) in each of the orientations. The one or more force or torque measurements in each of the at least two orientations are used to identify the center of mass of the work piece. Dynamic measured force or torque and motion of the work piece (motion response or motion feedback) in one or more orientations are used to identify various moments of inertia (MOI) around corresponding axes (e.g., X, Y, Z or yaw, pitch, roll and 45 degree off-axis measurements for products of inertia, POI). Motion of the work piece is recorded (and optionally determined) with a motion feedback sensor, position encoders associated with the manipulator or effector assembly or the like.

The coupling of the work piece to the manipulation assembly, movement, measurements and identification of the center of mass and MOI/POI (collectively physical characteristics of the work piece) are conducted in a rapid and accurate fashion (e.g., minutes or less to a few hours depending on weight and complexity of the work piece) in comparison to 20 hours or more with load tables, multiple critical lifts or the like.

In one example, the manipulator assembly includes a manipulator arm configured to reorient the work piece in the at least two different orientations. For example, the manipulator assembly includes a robotic manipulator arm configured to move with 6 degrees of freedom (3-axis rotation and 3-axis translation) to move the work piece in three-dimensional space. Optionally, the manipulator arm moves the work piece in such a manner that the motion includes a rotational component about each of the three axes for moment of inertia determination. In another example, the manipulator arm is configured to provide arbitrary three-dimensional motion to include all of the rotational components for MOI determination in one set of measurements. In still another example, the manipulator arm is configured to orient the work piece about an axis, rotate the work piece about the axis (e.g., parallel to a gravity or force vector and through the work piece center of gravity CG) to isolate the rotational components for each axis in different sets of measurements.

The manipulator arm includes one or more force or torque sensors (e.g., including separate or consolidated sensors), and the force or torque sensor measures one or more of forces or torques for the work piece transmitted between the work piece and the manipulator arm (e.g., weight, moment of the work piece relative to the arm or the like). Optionally, the one or more force or torque sensors are included in an effector assembly. The effector assembly is grasped by the manipulator arm and the manipulator arm operates the effector assembly to couple with the work piece, for instance with manipulator and work piece interfaces, respectively.

In another example, the manipulator arm includes a motion feedback sensor, such as an inertial measurement unit (IMU), motion encoder or the like. The motion feedback sensor directly measures the accelerations and velocities of the manipulator and work piece or measures one or more of the position or velocity of the manipulator and work piece to determine characteristics, such as acceleration. Optionally, the motion feedback sensor is included in the effector assembly. The effector assembly is grasped by the manipulator arm and the manipulator arm operates the effector assembly to couple with the work piece, for instance with manipulator and work piece interfaces, respectively.

In another example, the identification of a work piece center of mass, moments of inertia or the like as described herein is conducted in a rapid fashion. Optionally, the center of mass identification, moments of inertia identifications (including MOI and POI) are conducted as the work piece is moved between pieces of equipment or stations in a production or testing line. That is to say, as the manipulator assembly moves the work piece between pieces of equipment or production stations the manipulator assembly orients the work piece three-dimensionally (e.g., between two or more orientations, through a series of orientations or the like) and the sensors measure one or more of forces, torques, motion (motion responses based on forces or torques incident on the work piece such as rotation, rotational velocity or rotational acceleration) while moving, at one or more specified orientations or the like. Accordingly, the method, systems and devices described herein are readily incorporated in an existing or new production or testing line. Removal of the work piece from a line (perhaps for a day or longer) for testing to measure one or more physical characteristics such as center of mass, moments of inertia or the like is thereby avoided.

Furthermore, another problem to be solved includes minimizing measurement errors in the determination of physical characteristics of a work piece, such as center of mass and moment of inertia. For instance, sensors used in load tables and other measurement mechanisms, such as manipulator assemblies, are subject to measurement errors caused by measurement cross talk (e.g., force components measured along axes different than a test axis); creep in sensor elements, such as strain gauges, caused with lengthy testing periods or resting periods between tests (including while the work piece is reoriented); and low resolution measurements because of sensors having large ranges of operation.

The present subject matter provides a solution that minimizes measurement errors including the measurement errors discussed herein. The manipulator assembly, effector assembly (coupled with the manipulator assembly) or control module (of the effector or manipulator assembly) includes a test scheme module that provides a battery of techniques in combination with test configurations that rapidly determine physical characteristics of a work piece while at the same time minimizing measurement error. For instance, the test scheme module (or associated error isolation module) includes a load reversal module that generates reverse load testing schemes. The reverse load testing schemes include test configurations that are counterparts (e.g., inverted, diametrically opposed or the like) to test configurations associated with specified load testing schemes. A specified load testing scheme by itself uses the associated (initial) test configurations to measure one or more of force, torque or motion transmitted from the work piece to a sensor or motion relative to the sensor) to determine a physical characteristic such as center of mass or moment of inertia. The inclusion of the reverse load testing schemes provides additional counterpart test configurations that reverse the load on the sensor. The counterpart test configurations initiate near identical opposed physical deformation of the sensor relative to deformation caused with the test configurations. The measurement of force, torque, motion or the like in each of the test and counterpart test configurations corresponds with these opposed deformations and facilitates isolation of the error sources described herein and their removal from the measurements. For example, the raw measurements of the work piece from the reverse load and specified load testing schemes are combined to distill and isolate specified measurements (e.g., force along a specified axis, moment along a specified plane or the like) while at the same time minimizing residual measurements and error, such as cross talk measurements (off-axis or off-plane component measurements), creep error caused by sensor deformation over time, concentricity and alignment errors.

Additional measurement errors include one or more of creep (e.g., for instance in multiple directions or axes), non-linearity of measurements and error caused by temperature drift. In one example, the sensors used in one or more of the manipulator assembly or effector assembly are subject to two types of measurable deformation. The first deformation component includes instantaneous (e.g., also includes near instantaneous) deformation caused by loading of a sensor because of the weight and torque applied from a work piece to the sensor. The second deformation component includes creep type deformation gradually experienced by a sensor over time. For instance while a work piece is coupled to the sensor, the sensor experiences weight and torque that gradually deforms the sensor over time beyond deformation caused by the first (instantaneous) component of deformation.

In another example, the force, torque or motion sensors deform in a non-linear manner that generates non-linearity error in the corresponding measurements. In some examples, algorithms are used to approximate linear measurements based from the non-linear measurements. In still other examples, the temperature (such as variations in temperature) proximate to the force, torque or motion sensors causes one or more of expanding or contracting deformation of sensor elements that generate temperature drift errors in the corresponding measurements.

In an example, a work piece is coupled with the effector assembly and as part of the testing scheme moved through a series of orientations and tested (e.g., for one or more of forces, torque or the like) over a period of time. The sensor element (e.g., a strain gauge) is deformed by the first deformation component and this deformation is used to measure weight, torque and the like for the work piece. The sensor element also gradually deforms because of the second (creep) deformation component of deformation and skews the measurements based on the first (instantaneous) component. The second component of deformation is further aggravated because the work piece and the sensor are moved through multiple orientations as part of the testing scheme. Accordingly, the sensor experiences force and torques in a variety of relative directions and the corresponding creep type deformation of the sensor element is not limited to a single axis or direction, and instead occurs along multiple axes or directions. For example, instead of stretching and compressing along an X-axis, the sensor element is stretched or compressed along Y, Y and Z axes as well as intermediate orientations therebetween caused by forces transmitted while the work piece is moved between the various orientations.

The present subject matter provides a solution to these types of error. The manipulator assembly, effector assembly (coupled with the manipulator assembly) or control module (of the effector or manipulator assemblies) described herein includes one or more calibration modules and calibration units. The calibration module (e.g., in communication with a test scheme module) operates the manipulator assembly coupled with a calibration unit through a calibration scheme corresponding to a specified test scheme. The calibration unit, such as a 'golden unit', approximates the mass and other characteristics of the work piece (e.g., a unit under test or UUT), such as dimensions, materials or the like. The control module in combination with the calibration unit conducts the calibration scheme by moving the calibration unit through the orientations of the specified test scheme while collecting baseline measurements with the one or more sensors in those orientations. A calibration unit response includes the baseline measurements collected during implementing of the calibration scheme. The calibration unit is decoupled from the effector or manipulator assembly and the work piece is coupled in its place. The specified testing scheme, corresponding to the calibration scheme, is implemented and measurements taken by one or more sensors. Because the calibration unit approximates characteristics of the work piece and the calibration scheme corresponds to the specified testing scheme the sensor is subject to similar creep based deformation and corresponding error. The test scheme module implementing the specified testing scheme, in one example, refines the measurements for the work piece with the calibration unit response by isolating and removing error caused by creep deformation (and optionally other sources of error, such as non-linearity of the sensor response, cross talk, temperature drift or the like) common to the measurements collected in the specified test scheme as well as the corresponding calibration scheme. Further, because the calibration scheme and the specified testing scheme repeat similar motion, orientations or the like the one or more sensors experience corresponding common creep deformation (and optionally non-linearity, cross talk or the like) repeatedly, and the common error, such as creep deformation (non-linearity, cross talk or the like), is thereby reliably accounted for (e.g., isolated and removed). Accordingly, error present due to creep deformation of the sensor (and other forms of error, such as non-linearity, cross talk or the like) and common to both the testing and calibration schemes is accounted for and removed to enhance the accuracy of the measurements of the work piece.

The previously described non-linearity error based on non-linear deformation of the sensor, such as sensor element (e.g., strain gauge or the like) is, in one example, also addressed with the calibration module and calibration units. For instance, implementing of a calibration scheme and a corresponding test scheme provides a focused comparison of non-linearity in each corresponding measurement in each configuration (both test and calibration configurations) for the sensor instead of examination of non-linearity across the entire sensor band of the sensor. By calibrating and testing with similar loads (e.g., by way of the work piece and the calibration unit) in contrast to a range of varying loads the bounds of the non-linearity are restricted between the measurements taken during the calibration scheme and the corresponding measurements taken with the test scheme. As one example, non-linearity error based on a sensor range of 20 Nm to 0 Nm with an example 0.001 non-linearity effect is ±0.02 Nm and is significantly greater than the non-linearity error based on calibration and test measurements of 10 Nm and 11 Nm, respectively, ±0.001 Nm (assuming the example non-linearity effect of 0.001).

Another example of measurement error, more specifically decreased measurement accuracy, is found with torque sensors having a large operating range. For instance, sensors used with torque measurements to determine physical characteristics such as center of mass, moments of inertia or the like have large operating ranges in some examples because of the range of work pieces having various sizes and masses. Some example sensors include moment sensors configured to measure moments of around 100 inch pounds while other moment sensors are configured to measure moments of around 5000 inch pounds. Accuracy (e.g., a maximum error) for each of these sensors, in one example, is around 0.1 percent based on the range of operation. Accordingly, the actual accuracy or maximum error for the respective moment sensors described above is plus/minus 0.1 inch pounds for the 100 inch pound sensor and plus/minus 5 inch pounds for 5000 inch pound sensor. These measurement errors change based on the accuracy change based on the operating range for each sensor. As shown herein, the measurement errors increase with larger operating ranges for the sensors. Further still, the torque measurements are used for the determination of physical characteristics of a work piece, such as center of mass (e.g., CM or center of gravity, CG) and one or more moments of inertia. Measurement errors for torque are carried into the physical characteristic determinations and accordingly negatively affect the accuracy of the determined characteristics.

The present subject matter provides a solution to this type of measurement error based on decreased accuracy with large sensor operating ranges. The manipulator assembly, effector assembly (coupled with the manipulator assembly) or the like described herein includes an adjustable ballast system that positions a center of mass for the work piece and a counter ballast proximate to a sensor, such as a torque sensor. In one example, the adjustable ballast system includes a counter ballast movably positioned relative to the sensor. For instance, the counter ballast is coupled with a carriage, and the carriage is movably coupled with one or more rails extending away from the sensor. With the work piece coupled with the effector assembly or the manipulator assembly the counter ballast is moved along the rails until the center of mass of the composite assembly of the work piece and the counter ballast (e.g., an adapted center of mass) is proximate to the torque sensor. For example, the torque sensor measures a minimized moment (e.g., zero (0) or one or more inch pounds or the like) indicating the center of mass is proximate (aligned, substantially adjacent or the like) to a sensor plane of the torque sensor. With this arrangement a torque sensor having a small operating range of 100 inch pounds or less is used for measurement because of the minimized torque. As discussed herein, the torque sensor having the smaller operating range has a corresponding increased actual accuracy (e.g., 0.1 inch pounds in contrast to 5 inch pounds for the larger sensor).

Further still, because the counter ballast is movably positioned along rails including tracks, grooves, posts or the like movement of the counter ballast provides a continuous range of counter balancing torques based on the resolution of counter ballast movement (e.g., corresponding to a type of carriage actuator and encoder). The decoupling, installation, and assessment of multiple counterweights is accordingly minimized. Instead, the technician moves the counter ballast along the one or more rails relative to the sensor until a specified torque measurement is obtained (e.g., a minimal torque measurement such as zero or one or more inch pounds) indicating the center of mass for the measurement is proximate to the sensor plane of the torque sensor.

This overview is intended to provide an overview of subject matter of the present patent application. It is not intended to provide an exclusive or exhaustive explanation of the invention. The detailed description is included to provide further information about the present patent application.

FIG. 1A shows one example of a manipulation and testing system 100. As described herein the manipulation and testing system 100 is configured to measure one or more, force, torque, position, velocity or acceleration (including rotational equivalents) and determine one or more characteristics including the location of a center of mass (including the center of mass and center of gravity) of a work piece, moments of inertia (e.g., MOI, POI or the like) of the work piece, such as the work piece 108 coupled with the system 100. As shown, the manipulation and testing system 100 includes a manipulator arm assembly 102 and one or more of force, torque or motion sensors (including a consolidated sensor) associated with the manipulator arm assembly, for instance as part of an effector assembly or proximate to the coupling between the work piece 108 and the system 100. As will be further described herein one or more of the work piece center of mass, moments of inertia or the like are determined in one example as the manipulator arm assembly 102 orients the work piece 108 between two or more orientations, for instance while moving between two pieces of equipment of an assembly line or testing line.

Referring again to FIG. 1A, the manipulation and testing system 100 includes in an example a manipulator arm assembly 102 and one or more force, torque or motion sensors coupled with the manipulator arm assembly 102. In the example shown, the one or more force, torque or motion torque sensors (collectively mechanics sensors) are interposed between the work piece 108 and the manipulator arm assembly 102 proximate an effector assembly 106. As shown in the example of FIG. 1A, the effector assembly 106 is coupled with the manipulator assembly 102 at an effector interface 118. In another example, the effector assembly 106 is integral to the manipulator assembly 102. For instance, the effector assembly 106 including the one or more force, torque or motion sensors (mechanics sensors) is provided as a component of the effector interface 118.

The manipulator assembly 102 shown in FIG. 1A includes a multiple degree of freedom robotic arm (e.g., a manipulator arm 104). As shown, the manipulator arm 104 includes a manipulator base 112, a manipulator boom 114 and a manipulator arm member 116 coupled together at a plurality of joints interposed therebetween. As further shown in FIG. 1A, each of the manipulator base 112, the manipulator boom 114, the manipulator arm member 116 as well as the effector interface 118 are operated (rotated, twisted, spun or the like) with one or more actuators at joints. For instance, as shown in FIG. 1A the manipulator base 112 is shown coupled with the manipulator boom 114 with an interposing base actuator 120 that provides rotational actuation for the manipulator arm 104. As further shown, a boom actuator 122 is interposed between the manipulator boom 114 and the manipulator base 112 (e.g., coupled with a portion of the base actuator 120) to accordingly provide another axis of rotational movement for the manipulator arm 104. As further shown in FIG. 1A, an arm actuator 124 is interposed between the manipulator arm member 116 and the manipulator boom 114 to provide for rotational movement of the manipulator arm member 116 relative to the manipulator boom 114.

In yet another example, an interface actuator 126 is interposed between the manipulator arm member 116 and the effector interface 118 to accordingly provide one or more of rotation or tilting of the work piece 108 for instance by way of rotation or tilting of the effector interface 118 relative to the manipulator arm member 116. As shown in FIG. 1A, the work piece 108 is coupled with the manipulator arm member 116 by way of the effector interface 118. The manipulator arm 104 is in one example a multiple degree of freedom robotic arm manufactured or sold by ABB, Kuka, Staubli, Fanuc or other entities.

As described herein, in one example the manipulator arm assembly 102 includes the manipulator arm 104. One example of a manipulator arm 104 includes a robotic arm having a plurality of degrees of freedom (e.g., a multi-axis arm), for instance degrees of freedom provided by joints between one or more of the effector interface 118, the manipulator arm member 116, the manipulator boom 114 and the manipulator base 112. In another example, the manipulator arm assembly 102 includes one or more other manipulator systems including, but not limited to, multi-position and multi-axis fixtures coupled with the work piece 108. The fixtures are reoriented by way of a gyroscope, rails, positionable rings or the like to accordingly position the work piece 108 in two or more orientations, implement specified movement (e.g., for evaluation of moments of inertia) or the like used to identify physical characteristics of the work piece 108, such as center of mass, moments of inertia or the like. Accordingly, the manipulator arm assembly 102 is in some examples a plurality of systems including, but not limited to, the manipulator arm 104, gimbals, manipulation fixtures or the like configured to orient the work piece 108 in a plurality of orientations, move the work piece through specified movements or the like.

Figure 1B:
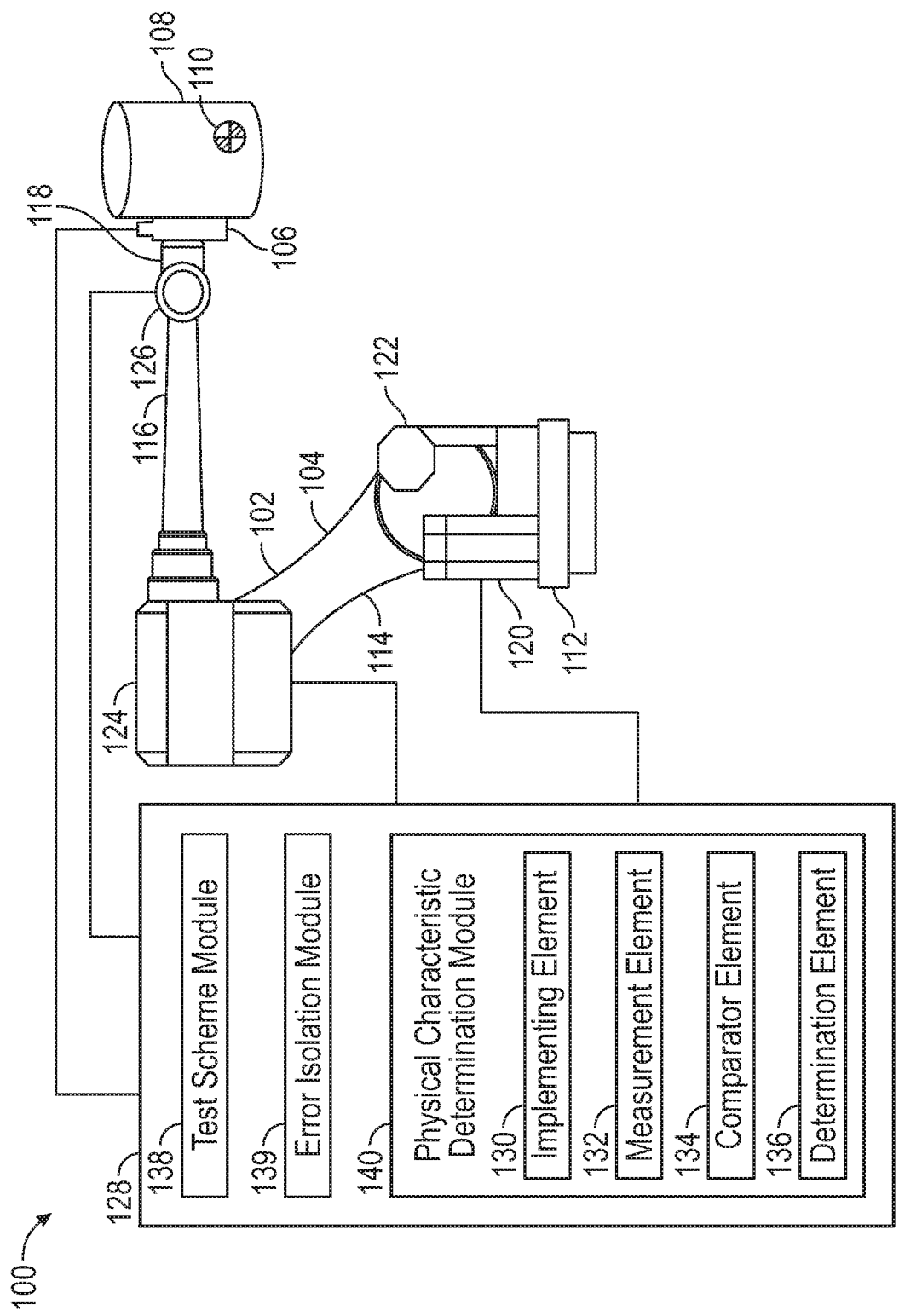
FIG. 1B is a schematic view of the manipulation and testing system of FIG. 1A.

FIG. 1B is a schematic diagram of the manipulation and testing system 100 shown in FIG. 1A. FIG. 1B includes a testing controller 128, such as a test scheme controller. The testing controller includes a test scheme module 138 having one or more test schemes. The test schemes each include one or more test configurations having specified orientations, movement or the like for use by the manipulator arm assembly 102. In other examples, the test schemes also control the measurement of one or more values, such as force, torque, position, velocity, acceleration or the like according to the specified test scheme. The testing controller 128 uses the one or more test schemes to measure values and determine characteristics of the work piece 108 including one or more of center of mass, moments of inertia or the like.

As shown in FIG. 1B, the testing controller 128 of the manipulation and testing system 100 is in communication with other components of the system 100 including, but not limited to, the manipulator arm assembly 102 (e.g., one or more of the actuators described herein) as well as the effector assembly 106 including for instance the mechanics sensors (e.g., configured to measure one or more force, torque, position, velocity or acceleration).

As further shown in FIG. 1B, the testing controller 128 includes a physical characteristic determination module 140 having one or more subelements (e.g., component modules) configured to control one or more of the manipulator arm assembly 102, the mechanics sensors described herein or analyze measurements and determine physical characteristics including, but not limited to, center of mass, moments of inertia or the like of the work piece 108. As shown, the physical characteristic determination module 140 includes an implementing element 130. The implementing element 130 is an interface with one or more of the base actuator 120, the boom actuator 122, the arm actuator 124 or the interface actuator 126 and implements the one or more orientations, movements or the like of the manipulator arm assembly 102 and the work piece 108. In another example, the implementing element 130 is the interface with the work piece 108 (e.g., through the effector assembly 106) and controls the configuration of the work piece 108. For instance, the implementing element 130 controls reconfiguring of the work piece 108 for the determination of a second center of mass, additional moments of inertia for a different configuration of the work piece or the like. In the example shown in FIG. 1B, the work piece 108 includes a work piece center of mass 110. In a reconfigured state, for instance with one or more portions of the work piece 108 removed or reoriented (corresponding to jettisoned rocket stages, fins, canards or the like, deployment of solar panels, instruments or the like), the work piece 108 has a second work piece center of mass. In this example, the test scheme module 128 measures the work piece center of mass 110 (shown in FIG. 1) as well as second, third or supplemental centers of mass of the work piece 108 in various configurations (e.g., with solar panels deployed, components jettisoned or the like). Additionally the implementing element 130 moves the work piece 108 through the plurality of orientations, specified movements or the like to facilitate the measurement of values (e.g., force, torque, kinematic values such as position, velocity or the like) associated with the work piece center of mass 110 (and supplemental work piece centers of mass as desired) as well as other characteristics such as moments of inertia.

As further shown in FIG. 1B, the physical characteristic determination module 140 of the testing module 128 includes a measurement element 132. The measurement element 132 is in communication with the mechanics sensors, such as a mechanics sensor suite, of the effector assembly 106. The measurement element 132 cooperates with the mechanics sensors to measure values such as force, torque, position, velocity or acceleration at the effector assembly 106 with the work piece 108 in different orientations, while moving or the like to determine one or more physical characteristics of the work piece 108 (e.g., center of mass, moments of inertia or the like).

As further shown in FIG. 1B, the physical characteristic determination module 140 optionally includes a comparator element 134 configured to compare one or more of the measured values, determined values of physical characteristics or the like with one or more threshold values. In various examples described herein, the comparator element 134 compares base measurements or determined values, taken or determined through implementing of a specified test scheme with counterpart measurements or determined values taken or determined from implementing one or more of the error isolation schemes described herein (e.g., a reverse load scheme, calibration scheme or the like). The comparison between these values isolates error common to both the base and counterpart values and facilitates removal of the isolated error from the measured values, determined physical characteristics or both.

A determination element 136 of the physical characteristic determination module 140 determines one or more of the physical characteristics of the work piece 108 based on values of one or more of measured force, torque, position, velocity or acceleration measured with the measurement element 132 in cooperation with the mechanics sensors. In one example, the determination element 136 removes (e.g., adjusts, offsets or the like) the isolated error identified with the comparator element 134 from one or more of the measured or determined values, characteristics or the like. As described herein, the removal of error from the values or characteristics enhances the accuracy and precision of determined characteristics, such as center of mass, moments or inertia as well as the measured values used in these determinations (e.g., one or more of force, torque, position, velocity, acceleration or the like).

In one example, the testing controller 128 includes an error isolation module 139 having one or more error isolation schemes. As described herein, the error isolation schemes provide one or more of orientations, movements, analysis of measurements, initializing of the system (e.g., through actuation of a counter ballast) or the like configured to minimize or isolate error in base measurements taken while implementing a test scheme. The refinement of the base measurements, for instance with removal of isolated error identified with the comparator element 134, enhances the precision and accuracy of determined values such as the physical characteristics. The error isolation module includes one or more error isolation schemes including, but not limited to, reverse loading schemes, calibration schemes (e.g., for use with a calibration unit), control of a counter ballast system or the like. Example error isolation schemes are described further herein.

As previously described, the manipulation and testing system 100 determines one or more physical characteristics of a work piece, including, but not limited to, center of mass, moments of inertia (including products of inertia) or the like. The system 100 measures values at mechanics sensors, such as the mechanics sensor suite 200 (see FIG. 2), including one or more of force, torque or motion (e.g., position, velocity, acceleration including rotational motion). The testing controller 128 determines the one or more physical characteristics based on the measured values. The mechanics sensor suite 200 and the testing controller 128 are included with the manipulation and testing system 100 having an effector assembly 106 integral to the system in one example. In another example, the mechanics sensor suite 200 and the testing controller 128 are included with an effector assembly 106 configured for coupling with the remainder of the system 100, such as a manipulator arm 104 proximate to the interface actuator 126, as shown in FIG. 1A.

Figure 2:
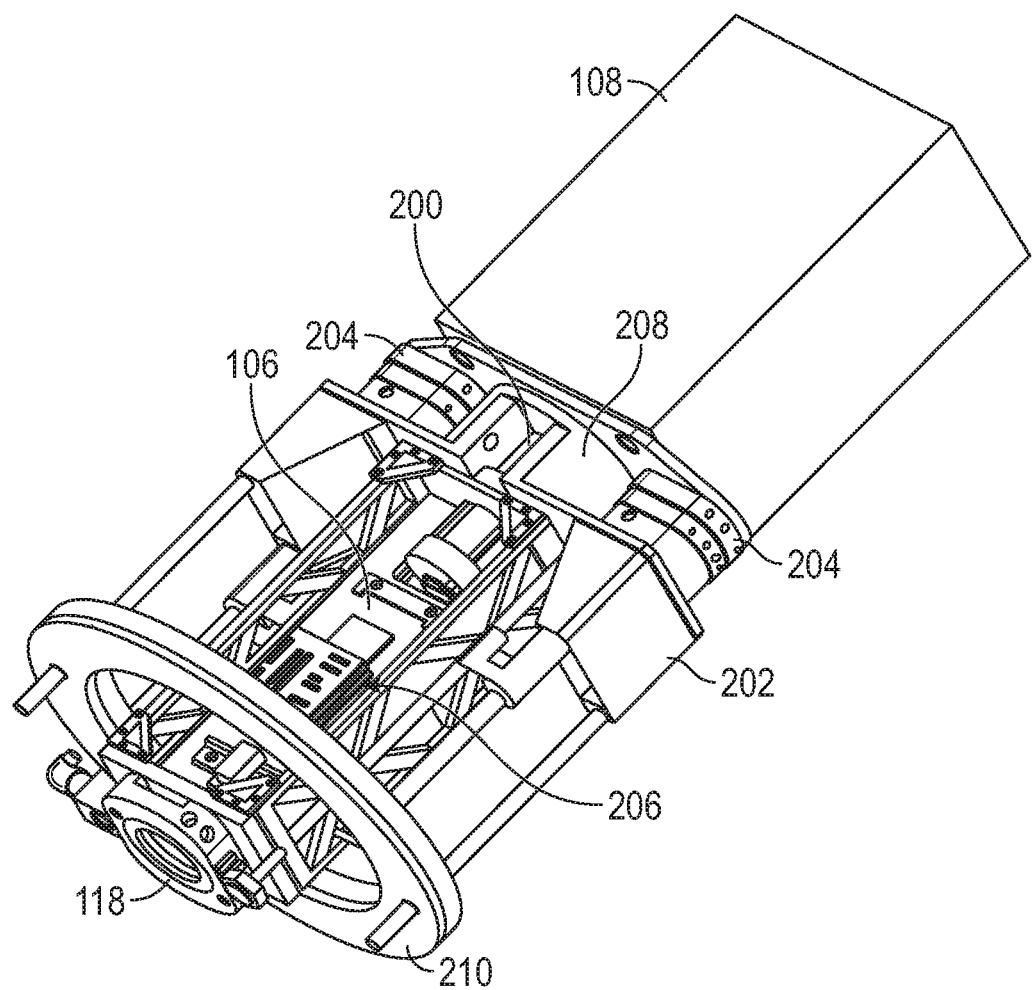
FIG. 2 is a perspective view of one example of an effector assembly coupled with a work piece.

FIG. 2 shows one example of an effector assembly 106, for instance corresponding to the effector assembly 106 previously shown in FIGS. 1A and 1B. In this example the effector assembly 106 includes an effector frame 206 extending between an effector interface 118 and a mechanics sensor suite 200. The mechanics sensor suite 200 is proximate a distal end of the effector assembly 106 relative to the effector interface 118, and includes one or more sensors including, but not limited to, force, torque, position, velocity, acceleration sensors, or the like. The mechanics sensors are configured to measure corresponding values or characteristics of the work piece 108 coupled with the effector assembly 106.

In the example shown in FIG. 2 the effector assembly 106 also includes an adjustable ballast system 202. As will be described herein the adjustable ballast system 202 is interposed between components of the effector assembly 106 and the work piece 108. The adjustable ballast system 202 includes a counter ballast 210 that is movable relative to a sensor interface 208 of the effector assembly 106 and the mechanics sensor suite 200. Movement of the counter ballast 210 changes the center of mass of a composite assembly of the work piece 108 in combination with the counter ballast system 202 to accordingly provide a composite center of mass proximate (e.g., adjacent, coincident, aligned or the like) the mechanics sensor suite 200 and the sensor interface 208. As will be described herein the adjustable ballast system 202 when operated in this manner minimizes measurement error with a torque sensor of the mechanics sensor suite by facilitating the use of a minimized operating range.

As further shown in FIG. 2 the effector assembly 106 includes one or more work piece latches 204. In one example the work piece latches 204 include one or more posts, pins, interfittings or the like configured to engage with corresponding components of the work piece 108. The work piece latches 204 accordingly buckle or connect the work piece 108 to the effector assembly 106 to facilitate the movement and measurement of the work piece 108 in one or more of the orientations as described herein to determine one or more physical characteristics of the work piece 108, such as the moments of inertia of the work piece 108, center of mass or the like. In one example the work piece latches 204 connect a portion of the work piece 108 proximate to the sensor interface 208 of the effector assembly 106 (e.g., optionally a component of the adjustable ballast system 202 when included). One or more of force, torque, motion (including one or more position, velocity, acceleration or the like) are measured with the mechanics sensor suite 200 in close proximity to the work piece 108 under investigation.

Figure 3:
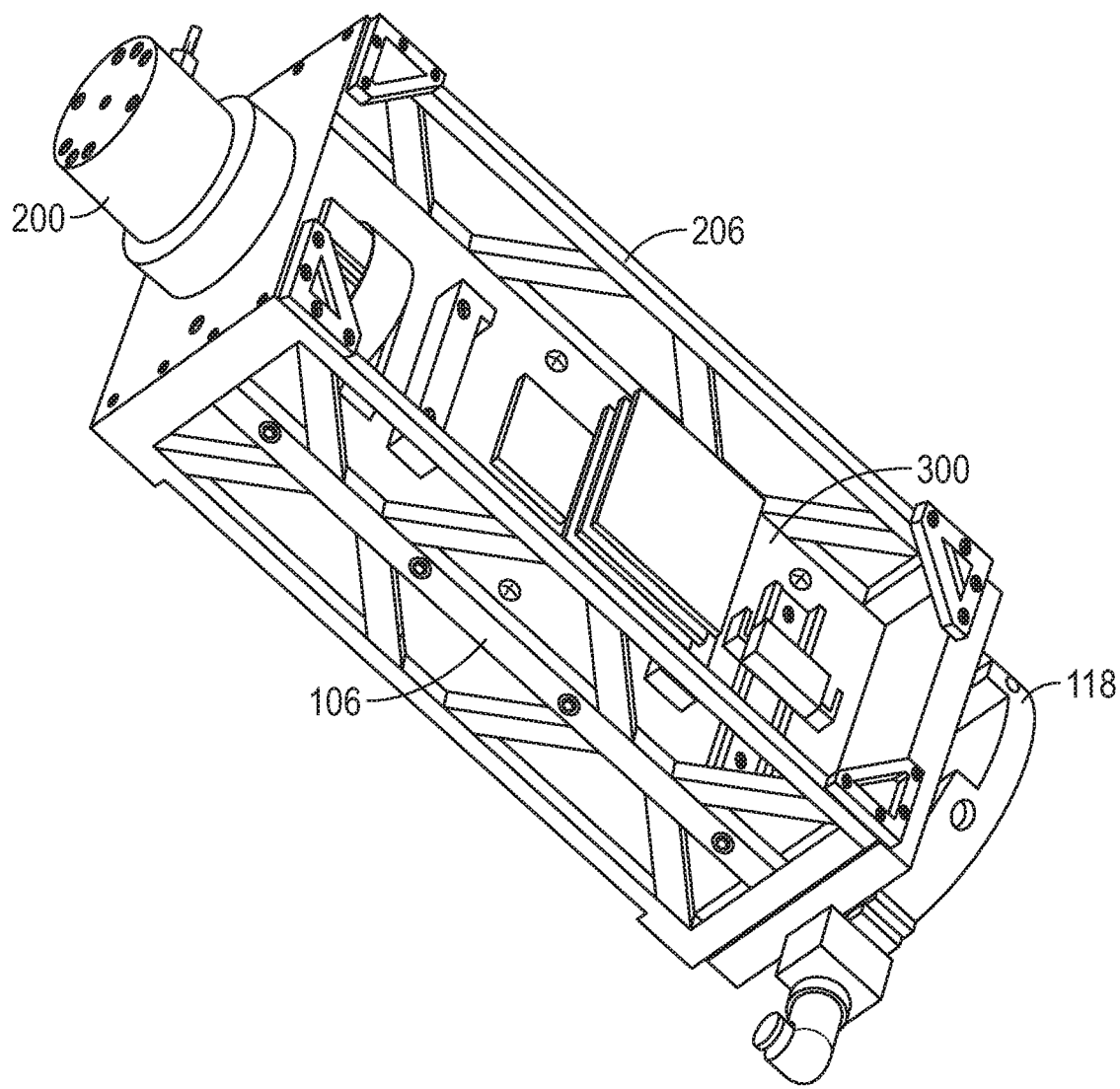
FIG. 3 is a detailed perspective view of the effector assembly of claim 2.

FIG. 3 shows another view of the effector assembly 106 shown previously in FIG. 2. In this example the effector assembly 106 does not include the adjustable ballast system 202. Instead the mechanics sensor suite 200 is shown in an exposed configuration with the sensor interface 208 of the adjustable ballast system removed. As shown the effector frame 206 extends from the effector interface 118 to the mechanics sensor suite 200. In one example the effector assembly 106 includes a testing controller 300 including one or more of a processor, memory or other components used in combination with mechanics sensor suite 200 to measure one or more values such as force, torque, position, velocity, acceleration or the like and thereafter determine one or more physical characteristics of the work piece 108 shown in FIG. 2. For instance, in one example the mechanics sensor suite 200 measures one or more of force or torque as well as one or more of position, velocity or acceleration to determine physical characteristics such as the center of mass, one or more moments of inertia (including products of inertia) or the like of the work piece 108. The testing controller 300 in one example is coupled with the mechanics sensor suite 200 and uses values measured with the mechanics sensor suite 200 to determine these physical characteristics.

Optionally, the testing controller 128 as previously shown in FIG. 1B (and as controller 300 in FIG. 3) is in communication with one or more other components of a manipulation and testing system 100. For instance the testing controller is in communication with one or more of the actuators associated with the manipulation and testing system 100 whether in a manipulator arm 104 or the effector assembly 106 including, but not limited to, one or more actuators effector assembly or the manipulator arm 104. As described herein the testing controller 128 including a test scheme module 138 is configured to implement movement of the work piece 108 between orientations and move the work piece 108 while in orientations for measurement of one or more values for use in determining the physical characteristics.

Figure 4:
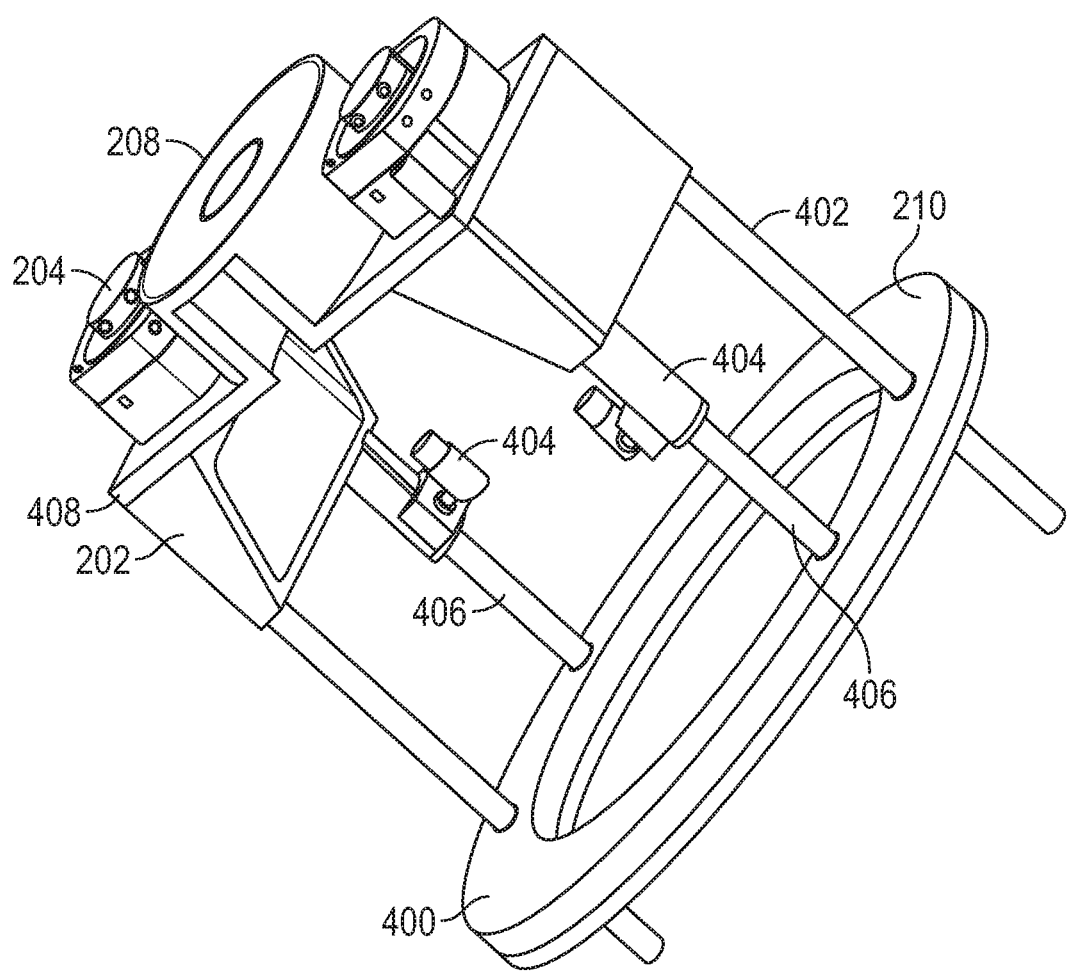
FIG. 4 is a detailed perspective view of an example adjustable ballast system.

FIG. 4 shows the adjustable ballast system 202 previously shown in FIG. 2. In FIG. 4, the system 202 is decoupled from the remainder of the effector assembly 106. The adjustable ballast system 202 includes a ballast bracket 408 that interposes at least a portion of the adjustable ballast system 202, such as the sensor interface 208, between the work piece and the mechanics sensor suite 200 shown in FIG. 3. Interposing of the sensor interface 208 between the mechanics sensor suite 200 and the work piece 108 facilitates the coupling of the work piece 108 to the adjustable ballast system 202 to provide a composite assembly of these components and facilitate repositioning of a composite center of mass, for instance proximate to the mechanics sensor suite 200 as described herein. Operation of the adjustable ballast system 202 moves the center of mass of the composite assembly as specified by one or more of a test scheme, error isolation scheme or the like described herein.

As further shown in FIG. 4, the adjustable ballast system 202 in this example includes a counter ballast 210 movably positioned relative to the ballast bracket 408. The counter ballast 210 includes an annular component weight or the like positioned around the remainder of the effector assembly 106. For instance, as shown in FIG. 2 the counter ballast 210 surrounds the effector assembly 106 and accordingly moves along a coincident axis to the effector assembly 106. The counter ballast 210 optionally includes a carriage 400 (another form of the counter ballast weight) movable along one or more guides 402. The carriage 400 provides a base for the coupling of additional counter ballast weights, for instance with work pieces that are relatively heavy, elongate or the like. In various examples the guides 402 extend from the ballast bracket 408 and provide one or more of rails, rods, posts, channels or the like to guide the movement of the counter ballast 210 toward and away from the ballast bracket 408, the sensor interface 208 and the mechanics sensor suite 200 (when coupled with the sensor interface 208).

As further shown in FIG. 4 the adjustable ballast system 202 optionally includes a ballast actuator 404 interposed between the ballast bracket 408 and the counter ballast 210. In one example the ballast actuator 404 includes a drive shaft 406 connected with the remainder of the actuator 404. Optionally, multiple actuators are coupled between the ballast bracket 408 and the counter ballast to minimize tilting or binding of the counter ballast 210 along the guides 402. The drive shaft 406 extends from the remainder of the actuator to the counter ballast 210. Operation of the ballast actuator 404 translates the drive shaft 406 and accordingly moves the counter ballast 210 toward and away from the sensor interface 208 and the mechanics sensor suite 200 when assembled with the effector assembly 106.

In various examples the ballast actuator 404 facilitates continuous positioning of the counter ballast 210 relative to the remainder of the adjustable ballast system 202. For instance, the counter ballast 210 is moved in a continuous manner (e.g., with infinite or near infinite resolution) toward and away from the sensor interface 208 to accordingly provide a continuously variable counter moment to the work piece 108. In one example, the ballast actuator 404 includes a piezo motor, screw drive or the like that facilitates continuous (including near continuous movement) of the counter ballast 210 including but not limited to rotational/translational movement of the drive shaft 406, stepped translation of the drive shaft 406 or the like. Because the adjustable ballast system 202 provides continuous movement (including near continuous stepped movement) of the counter ballast 210 the applied counter torque is also continuously variable relative to the work piece. Accordingly, the addition and subtraction of graduated weights and coupling and decoupling of each graduated weight as used in other systems is avoided. Instead, the counter ballast 210 is a consistent weight (optionally configured for a specific work piece 108 or the like) that is moved in a continuous fashion toward and away from the sensor interface 108. The corresponding counter moment provided to the sensor interface 208 in one example counters the moment applied by the work piece 108. Because the counter ballast 210 is moved in a continuous fashion toward and away from the sensor interface 208 the adjustment of the counter moment to the work piece 108 is correspondingly continuous as well. The positionable counter ballast 210 provides a continuous corresponding counter moment to the work piece 108 that moves the effective center of mass (e.g., an adapted center of mass, composite center of mass or the like) of the composite assembly in a continuous fashion toward and away from the sensor interface 208.

In some examples, the testing controller 128 moves the counter ballast 210 toward and away from the sensor interface 208 while measuring the resulting torque at the mechanics sensor suite (see FIG. 3). In one example, the testing controller 128 moves the counter ballast 210 until the measured moment is proximate to zero (0.0) newton meters (or inch pounds) indicating the adapted center of mass of the composite assembly of the adjustable ballast system 202 and the work piece 108 is proximate to the mechanics sensor suite 200 (e.g., a sensing plane of the suite). Examples illustrating the determination of example physical characteristics of the work piece 108 with the manipulation and testing system 100 are provided herein. For instance, FIGS. 5A-E and the associated description illustrate one example of the determination of the center of mass of the work piece 108. FIGS. 6A-7C illustrate examples for determinations of moments of inertia of the work piece 108.

Figure 5A:
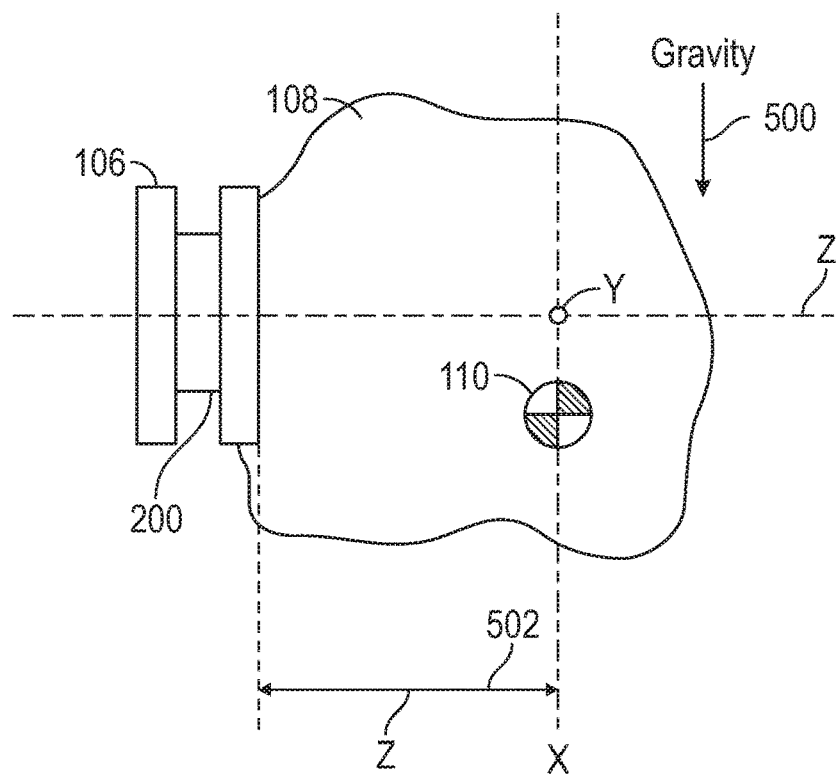
FIGS. 5A-5E are schematic diagrams showing a determination of a work piece center of mass in two or more orientations.
Figure 5B:
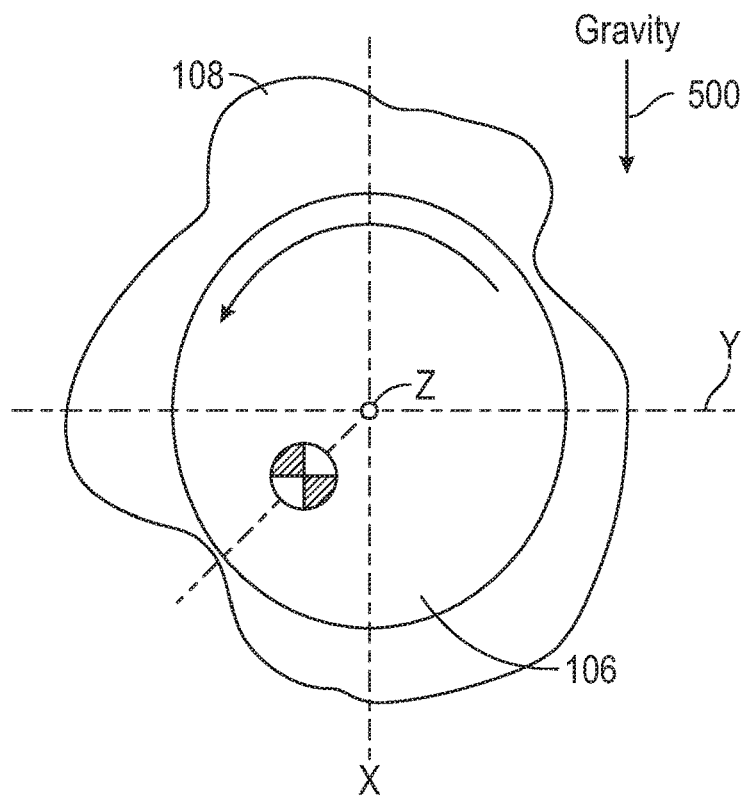
Figure 5C:
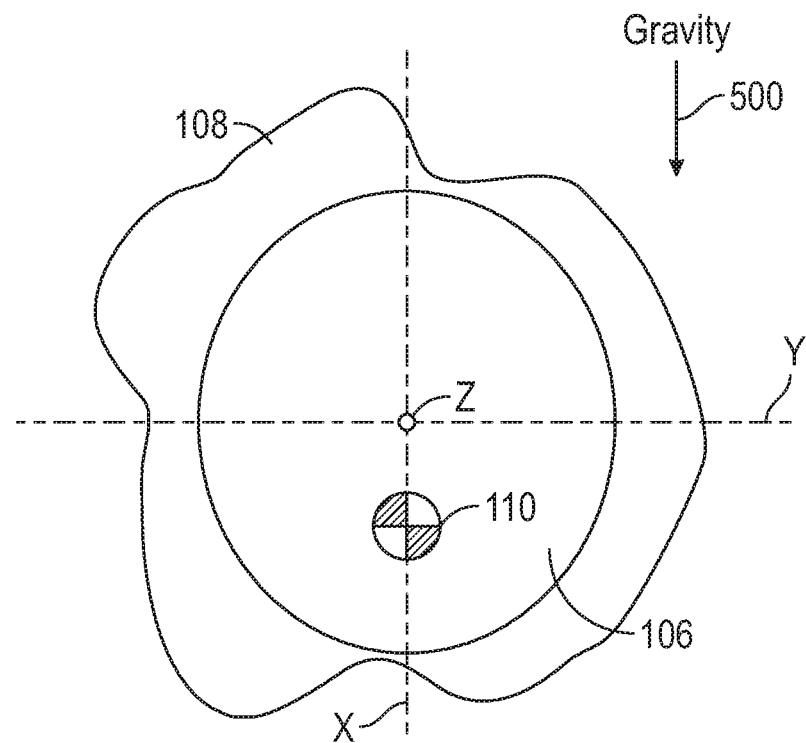
Figure 5D:
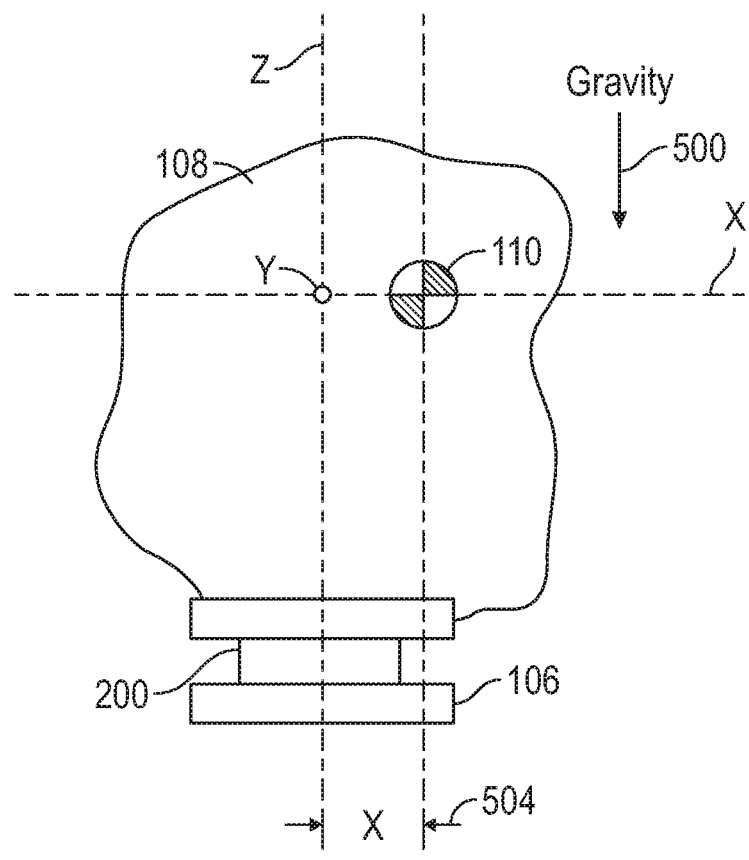
Figure 5E:
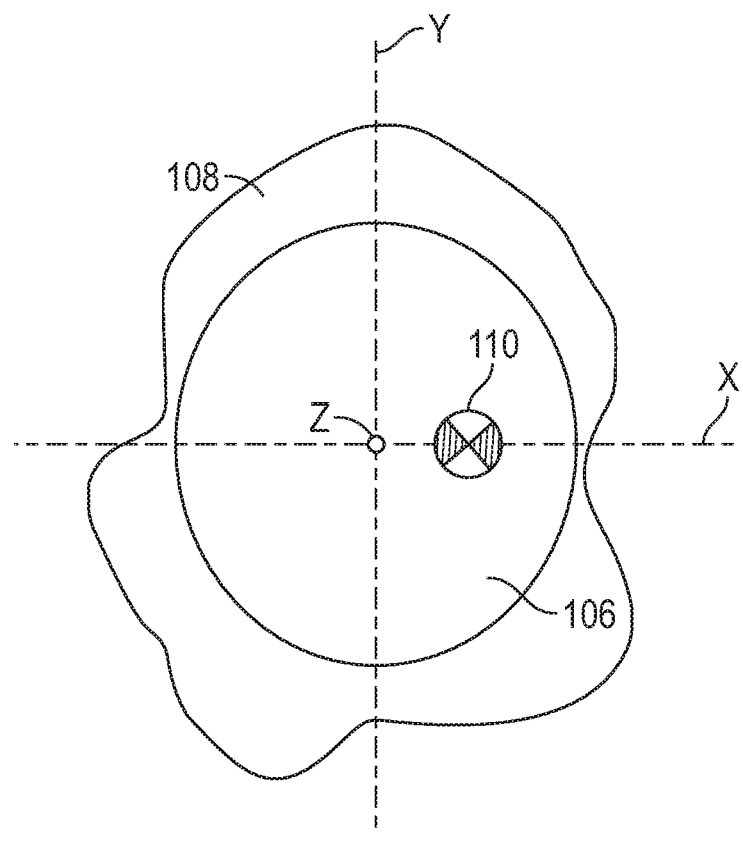

Referring first to FIGS. 5A-E, the work piece 108 is coupled with the effector assembly 106 of the manipulation and testing system 100 (see FIGS. 1 and 3) and positioned in a plurality of orientations including a first orientation shown in FIGS. 5A-C and a second orientation shown in FIGS. 5D, E. As described herein, an example determination of the work piece 108 center of mass is provided. In the examples shown in FIGS. 5A-E the work piece 108 is shown in the (at least) two orientations to identify the work piece center of mass 110 as described herein. Although the example provided in FIGS. 5A-E shows the work piece in two orientations for determining the work piece center of mass 110 in another example the work piece 108 is oriented through three or more orientations to provide increased resolution and enhanced accuracy of the location of the work piece center of mass 110. As discussed herein the orientation shown in FIGS. 5A-C is labeled as a first orientation and the orientation shown in FIG. 5D-E is labeled as a second orientation, Labeling of the orientation is a convention and not limiting. Accordingly, the orientation shown in FIGS. 5A-C is alternatively labeled the second orientation and the orientation shown in FIGS. 5D-E is labeled the first orientation in another example. Alternative orientation labels are also used in other examples including, but not limited to, upright, lateral, vertical, horizontal, first angle, second angle or the like.

Referring first to FIG. 5A, the work piece 108 is shown in a first orientation (e.g., a lateral orientation) with the work piece center of mass 110 positioned along an imaginary x axis extending downward. The y axis extends into and out of the page and the z axis extends from the left to the right for instance through the effector assembly 106. The gravity vector 500 (see FIG. 5B) is shown in a downward direction relative to the work piece 108 and the effector assembly 106. Although the orientation shown in FIG. 4A includes the work piece 108 extending laterally from the effector assembly 106, in another example, the work piece 108 extends at substantially any orientation from the effector assembly (along an axis, at an angle to one or more axes including the gravity vector 400 or the like) that differs from the orientation used as the second orientation.

In the first orientation shown in FIG. 5A, a component of the work piece center of mass 110 location, an exemplary z location 502 is determined relative to the effector assembly 106. At FIG. 5B the work piece 108 is rotated in a clockwise or counterclockwise fashion around the z axis (FIG. 5B is an end view of the work piece 108) to align the work piece center of mass 110 with the x axis. The aligned work piece center of mass 110 is shown in FIG. 5C. In one example, the work piece 108 is rotated around the z axis until the torque measured around the z axis is zero (newton-meters, pound-inches, or the like). Once the torque measurement around the z axis is zero the work piece center of mass 110 is aligned with the x axis and accordingly the z location for the center of mass 110 is along a plane of potential points formed by the x and z axes. In the orientation shown in FIG. 5C the torque of the work piece 108 incident on the effector assembly 106 is measured with the mechanics sensor suite 200 shown in FIGS. 2 and 3. In one example, the torque measurement taken by the effector assembly 106 is stored in the testing controller 128 including a storage element therein.

Referring now to FIG. 5D, the work piece 108 is shown in a second orientation for instance in a substantially vertical orientation (e.g., an upright orientation) relative to the effector assembly 106. Although the orientation shown in FIG. 5D includes the work piece 108 upright relative to the effector assembly 106, in another example, the work piece 108 extends at substantially any orientation from the effector assembly (along an axis, at an angle to one or more axes including the gravity vector 500 or the like) that differs from the orientation used as the first orientation.

In the second orientation shown in FIGS. 5D and 5E another torque measurement is taken as well as a weight measurement (force measurement) to determine the mass or weight of the work piece 108. Referring first to FIG. 5D, the work piece 108 is shown in the substantially vertical orientation relatively above the effector assembly 106 including the mechanics sensor suite 200. As shown, the work piece 108 is manipulated relative to another axis (e.g., the y axis) until the torque measured by the mechanics sensor suite 200 about the y axis is zero. In this orientation the work piece center of mass 110 is aligned with the x axis as well as they axis and thereby a plane of potential locations of the center of mass 110 is provided along the x axis. In this orientation a second torque measurement is conducted by the mechanics sensor suite 200 and the sensor suite (e.g., a force sensor of the sensor suite) also measures the weight of the work piece 108 incident on the sensor suite 200. Optionally, the weight of the work piece 108 is a known quantity (e.g., based on weights of the assembled components, a weighing procedure previous conducted or the like).

With the weight of the work piece 108 known and two torque measurements taken in each of the two orientations shown in FIGS. 5A-E the location of the work piece center of mass 110 is determined. For instance referring to FIG. 4C, the y location of the center of mass is determined to be zero relative to the intersection of the x axis, y axis and z axis (an origin at the effector assembly 106). The z location shown for instance in FIG. 5A is determined by equating the torque measurement in the orientation shown in FIGS. 5C and 5A to the force or the weight of the work piece 108. The torque and force equation (T=F×D) is solved to determine the z location 502 of the work piece center of mass 110 corresponding to the moment arm measured from the work piece center of mass 110 to the effector assembly 106. In a similar manner the torque measurement with the work piece 108 in the orientation shown in FIGS. 5D and 5E (5E being a bottom view of the work piece 108 in 5D) is equated to the measured force (e.g., the weight of the work piece 108) and solved for the x location 504 shown in FIG. 4D (corresponding to the moment arm between the work piece center of mass 110 and the effector assembly 106). The x location 504 shown in FIG. 5D and the z location 502 shown in FIG. 5A along with the corresponding y location of the work piece center of mass 110 (zero along the y axis) accordingly provides a three dimensional identification of the work piece center of mass 110 for the work piece 108.

Optionally, where one or more of the first and second orientations are at angles relative to axes and the gravity vector 400 the moment measurements and force measurements are used with corresponding equations including component forces and vectors (e.g., sine, cosine, tangent components or the like) to identify the location of the work piece center of mass 110.

In another example the work piece 108 is oriented into a third orientation to accordingly provide another dimensional location for the work piece center of mass 110. In combination with the previous torque measurements and the work piece weight the location of the work piece center of mass 110 is determined relative to another axis to further refine the location of the work piece center of mass 110.

In still another example and as previously described herein, the manipulation and testing system 100 including the testing controller 128 is coupled with the work piece 108 by one or more of the data and power links. The testing controller 128 in one example reconfigures the work piece 108 into one or more configurations including a deployed configuration (with one or more solar panels or other instruments deployed relative to the remainder of the work piece) or another orientation, for instance where one or more pieces of equipment are moved inside or around the work piece 108. In the reconfigured orientation the work piece 108 includes a second work piece center of mass different from the work piece center of mass 110 (e.g., shown in FIGS. 5A-E). In such an example the work piece 108 is oriented through two or more orientations and corresponding torque measurements are used with the overall weight of the assembly (assuming the weight stays the same, if the weight changes the weight is determined again) are used to re-identify the work piece center mass such as a second work piece center mass corresponding to the reconfigured work piece 108.

In another example, and as shown in FIGS. 6A-7C the manipulation and testing system 100 is used to determine one or more moments of inertia of the work piece 108. In a similar manner to determining center of mass the work piece 108 is attached to the manipulator arm 104 (see FIGS. 1A, B), for instance with the effector assembly 106. The manipulator arm 104 orients the work piece 108 into a first position for an x-axis measurement according to one or more test schemes having an associated test configuration (e.g., from the test scheme module 138) and rotates the unit around an axis 600 coincident with the gravity vector 602 through the center of mass 604 according to the specified test scheme (See FIG. 6A). The testing controller 128 records the motion and motion response of the work piece with the mechanics sensor suite 200 using one or more motion response sensors. In one example, the motion response sensors include one or more of position, velocity and acceleration sensors. In another example, the most response sensors of the mechanics sensor suite 200 include one or more of these sensors, and additional motion values are determined through derivation or integration of measured values, such as velocity or position. The mechanics sensor suite 200 (e.g., a torque sensor) measures the reaction torques produced by the motion. The testing controller 128 records torque and motion measured (or determined) values.

Figure 6A:
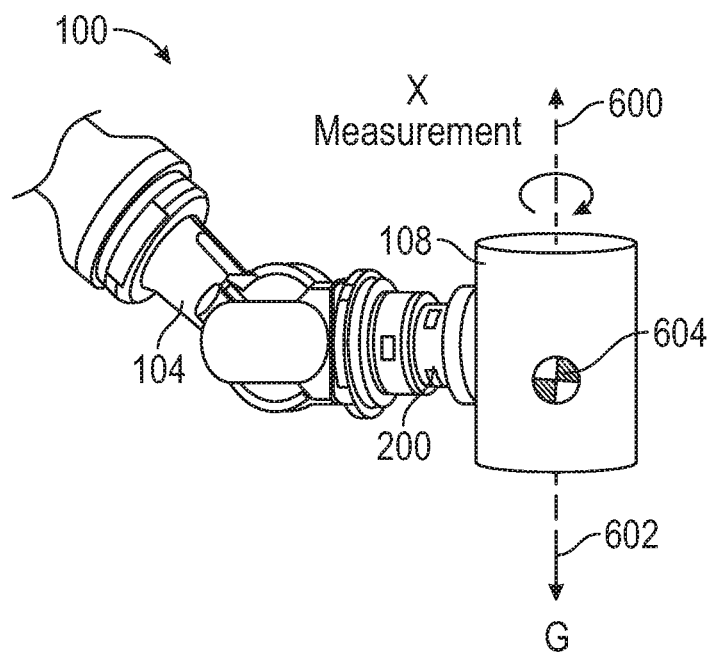
FIGS. 6A-6C are schematic diagrams showing one example of a determination of work piece moments of inertia.
Figure 6B:
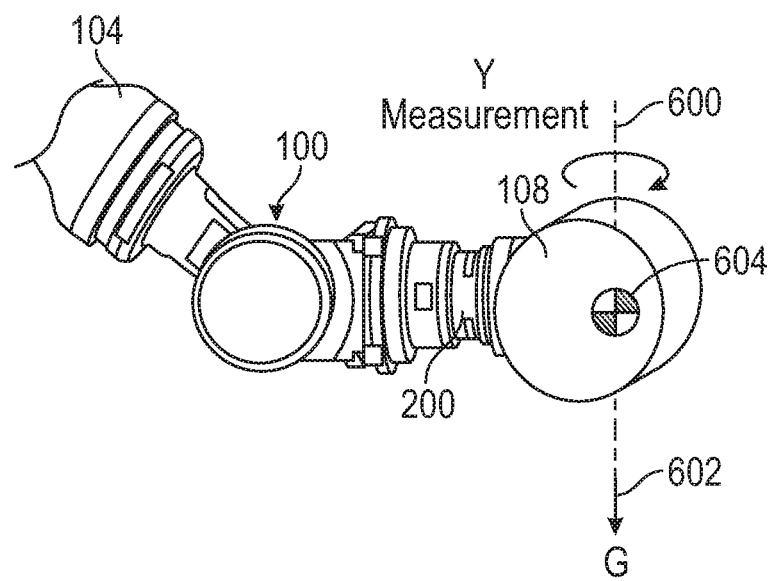

The manipulator arm 104 moves the work piece into position for the y-axis measurement (as a second configuration included with the specified test scheme) as shown in FIG. 6B and rotates the unit around the axis 600 coincident with the gravity vector 602 through the center of mass 604. In a similar manner to the first configuration, the mechanics sensor suite 200 measures at least one motion of the work piece 108 with one or more motion sensors and optionally determines one or more other aspects of motion through derivation, integration or the like). The mechanics sensor suite 200 measures reaction torques e.g., with a torque sensor) corresponding to the motion of the work piece 108.

The manipulator arm 104 the work piece into position for the z-axis measurements (as provided in FIG. 6C) and rotates the work piece 108 around the axis 600 coincident with the gravity vector 602 according to the specified test scheme. The mechanics sensor suite 200 in communication with the testing controller 128 measures or determines the motion of the work piece 108 and measures the reaction torques from the motion.

The work piece 108 is decoupled from the manipulator arm 104 and proceeds with further processing, assembly or the like. Measured and determined values from the mechanics sensor suite 200 are processed through a series of algorithms to calculate one or more moments of inertia (MOI, including products of inertia) for the work piece 108. In one example (e.g., with the mechanics sensor suite 200) the MOI determination is made according to the following equation:

$$I = \frac{\tau}{\alpha}$$

Where I is the moment of inertia relative to the axis of rotation, tau is the torque and alpha the rotational acceleration (measured or derived as described herein). Optionally, the specified test scheme or another separate test scheme (e.g., for determining the MOT relative to one or more axes) is implemented for off-axis orientations to calculate the resultant POI (products of inertia).

Figure 7A:
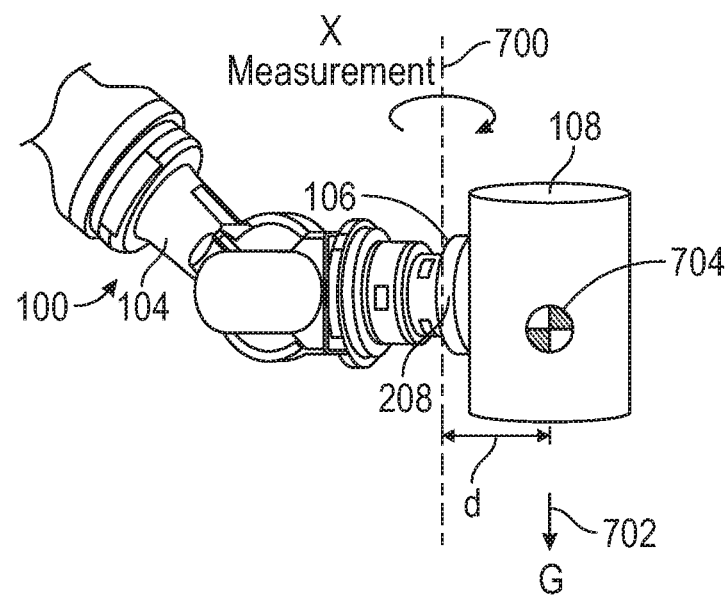
FIGS. 7A-7C are schematic diagrams showing another example of a determination of work piece moments of inertia.
Figure 7B:
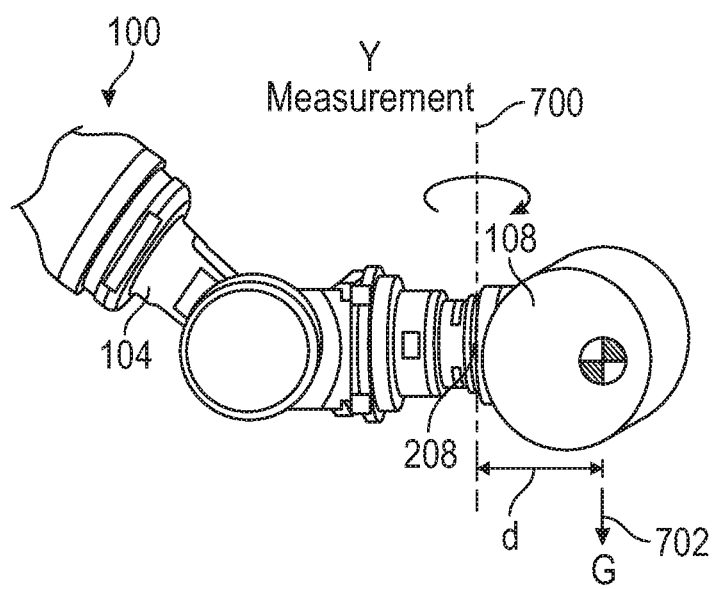
Figure 7C:
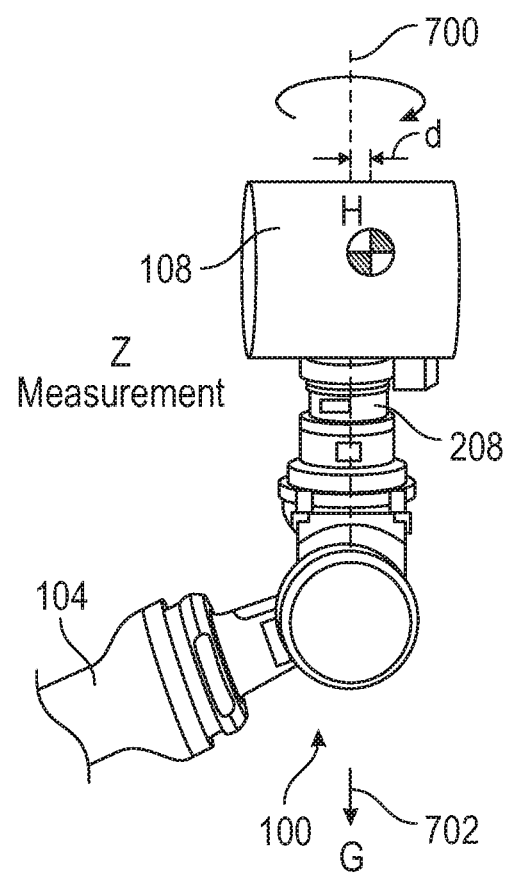

In another example, for instance with the axis of rotation offset from the center of mass of the work piece, a modified version of the above equation is used to determine the moments of inertia. FIGS. 7A-C show examples of the manipulation and testing system 100 with the work piece 108 a plurality of configurations for determining respective moments of inertia. In these examples, the work piece 108 is rotated around an axis 700 spaced from the work piece center of mass 704 (e.g., non-coincident). In each of these orientations the work piece 108 is rotated around the axis 700 proximate to the sensor interface 208 of the effector assembly 106 having the adjustable ballast system or proximate to a sensing plane of the mechanics sensor suite 200 without the ballast system. The axis of rotation 700 is parallel to and offset from a gravity vector 702 extending through the work piece 108 center of mass 704.

Figure 6C:
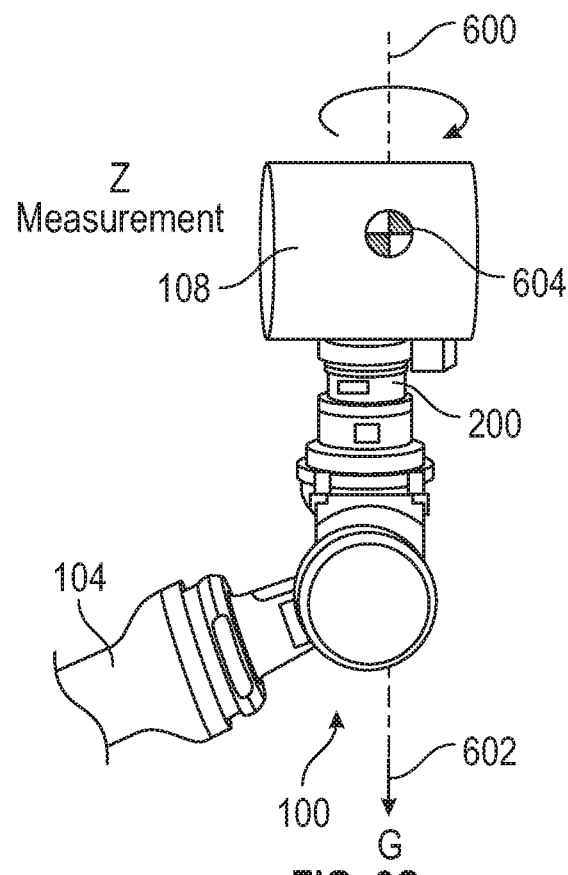

The determination of moments of inertia in the orientations shown in FIGS. 7A-C are related to the determination corresponding to FIGS. 6A-C. The determination relative to the axis of rotation 700 includes an adjustment provided with the Parallel Axis Theorem. The equation for the moment of inertia of the work piece 108 with this offset is provided below:

$$I_{CM} = h - m * d^2$$

In the equations provided above, h is the moment of inertia of the work piece 108 determined around the axis of rotation 700 using the equation provided previously (based on torque and measured or determined angular acceleration). $I_{CM}$ is the moment of inertia of the work piece relative to the gravity vector 702 through the center of mass 704. Further, d shown in FIGS. 7A-C is the linear distance between the axis of rotation in each orientation and the gravity vector through the center of mass. The variable m is the mass of the work piece.

As previously described herein and shown for instance in FIGS. 5A-7C one or more testing schemes are provided for the determination of physical characteristics of a work piece 108 including, but not limited to, center of mass, moments of inertia or the lie. Referring to FIG. 2, in one example the manipulation and testing system 100 includes an effector assembly 106 as an integral or separate component of the system 100. The effector assembly 106 is interposed between the work piece 108 and one or more manipulation features including for instance the manipulator arm assembly 102 shown in FIG. 1A.

The effector assembly 106 includes the mechanics sensor suite 200 having one or more sensors including, but not limited to, force, torque, or motion sensors (including one or more of position, velocity, acceleration or the like). One or more of the sensors included with the mechanics sensor suite 200 in various examples include strain gauges, piezo elements, or the like. These sensors include sensing elements that are deformed when loaded by way of torque, weight or the like from the work piece 108. The deformation of the sensor element causes a voltage, current, resistance, change in electrical properties or the like corresponding to one or more of force, torque or the like. The deformation of the sensors caused by the work piece 108 while moved between orientations, moved while in a particular orientation or while suspended in one or more orientations to determine the center of mass, moments of inertia or the like is a relatively instantaneous deformation of the sensor element. In various examples the sensor elements are subject to additional forms of deformation that in some examples introduce error to the measurements of characteristics including, but not limited to, motion, force or torque with the sensor elements of the mechanics sensor suite 200.

Figure 8:
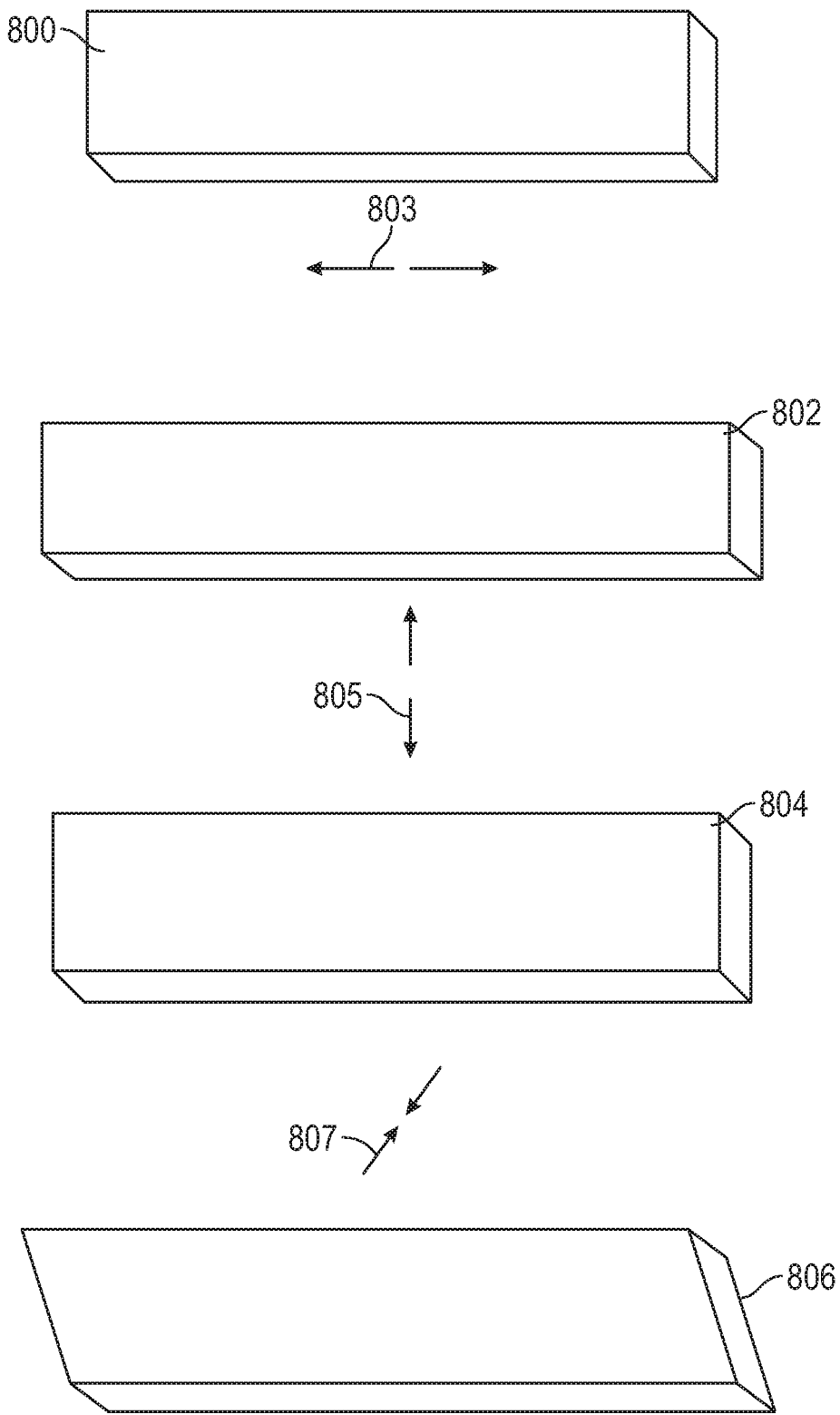
FIG. 8 is a schematic diagram of a sensor element experiencing creep deformation with different loads.

One example of a sensor element 800 is provided in FIG. 8 and is shown in a series of deformed configurations illustrating, in an exaggerated manner, the deformation of the sensor element 800 over time (e.g., creep deformation) that causes error in measurement and corresponding determinations of physical characteristics based on those measurements. As shown in FIG. 8 the sensor element 800 is in one example a strain gauge element, piezoelectric element or the like provided in an initial element configuration 802. For illustration purposes the initial element configuration 802 is shown as a three-dimensional rectangle having the qualitative dimensions shown. As shown in later views of FIG. 8 the sensor element 800 experiences a plurality of different creep deformations based on applied loads (e.g., whether passive from gravity, motion based or the like). Test schemes described herein include one or more component testing configurations providing specified orientations or movement of the work piece for one or more force, torque or motion measurements. In these orientations and while the work piece is suspended and awaiting testing the sensor element 800 is deformed along multiple axes. As previously described, instantaneous deformation is used as the component of deformation in the sensor element 800 to measure one or more of force, torque or motion for physical characteristic determinations. Creep deformation (e.g., gradual deformation over time) of the sensor element 800 introduces error to these measurements and determinations.

As shown in the various views of FIG. 8, creep is in some examples experienced by the sensor element 800 along a plurality axes, directions, vectors, or the like for instance corresponding to the various loads applied, movement of the work piece 108 or the like measured through deformation of the sensor element 800. These loads are in various examples experienced throughout a testing scheme including, but not limited to, coupling of the work piece 108 with the manipulation testing system 100 and actual implementation of test schemes for instance from the test scheme module 138 with the manipulator arm assembly 102 or the like. Creep deformation of the sensor element 800 is difficult to measure and remove from measurements with sensors of the mechanics sensor suite 200 including one or more of the example sensor elements 800. In some examples this error if not accounted for carries forward into determinations for instance the determinations of physical characteristics of the work piece 108 including its center of mass, moments of inertia or the like.

Referring again to FIG. 8, various examples of creep-based deformation of the example sensor element 800 are provided. For instance, example creep deformation is shown with a first tension load 803, a second transverse tension load 805 and a third intermediate orientation load 807. The sensor element 800 is deformed into the corresponding orientations 802, 804, 806 by these loads. These configurations 802, 804, 806 are exaggerated in FIG. 8 to illustrate the variation in the shape of the sensor element 800.

In various examples, the example sensor element 800 experiences these (and potentially other) creep deformations shown in FIG. 8 as the work piece 108 is oriented in one or more varied configurations, subject to various motions or the like as shown in FIGS. 5A-7C. The configurations shown in FIG. 8 are further exaggerated and compounded with complex movement of the work piece 108 for instance into one or more orientations, movement at the one or more orientations, movement between the one or more orientations as well as the length of the various test schemes implemented with the testing module 138. For instance, one or more of the loads 803, 805, 807 in FIG. 8 are in some examples repeatedly experienced over different time periods, along different axes, and in differing magnitudes based on movement of the manipulation and testing system 100 and the work piece 108 while conducting different testing schemes. Accordingly, complex intricate movements of the work piece 108 while oriented and moved through test scheme configurations correspondingly enhances magnitudes and directions of the creep deformation.

As described herein, the testing controller 128 (see FIG. 1B) includes an error isolation module 139 that includes one or more error isolation schemes configured to isolate (e.g., detect, account for or the like) various errors introduced to measurement of one or more values such as force, torque or motion, for instance with the sensor elements of the mechanics sensor suite 200. Creep deformation is one example of such error. Additional types of error isolated with the error isolation schemes include, but are not limited to, non-linearity of sensor response, alignment and concentricity error, cross talk between various components of the sensors of the suite 200, variations in measurement caused by temperature drift, variability in measurement accuracy because of relatively large sensor operating ranges or the like. The error isolation scheme examples described herein facilitate the isolation and removal of these types of error and thereby enhance the precision and accuracy of measurements and the determined physical characteristics based on those measurements.

Figure 9:
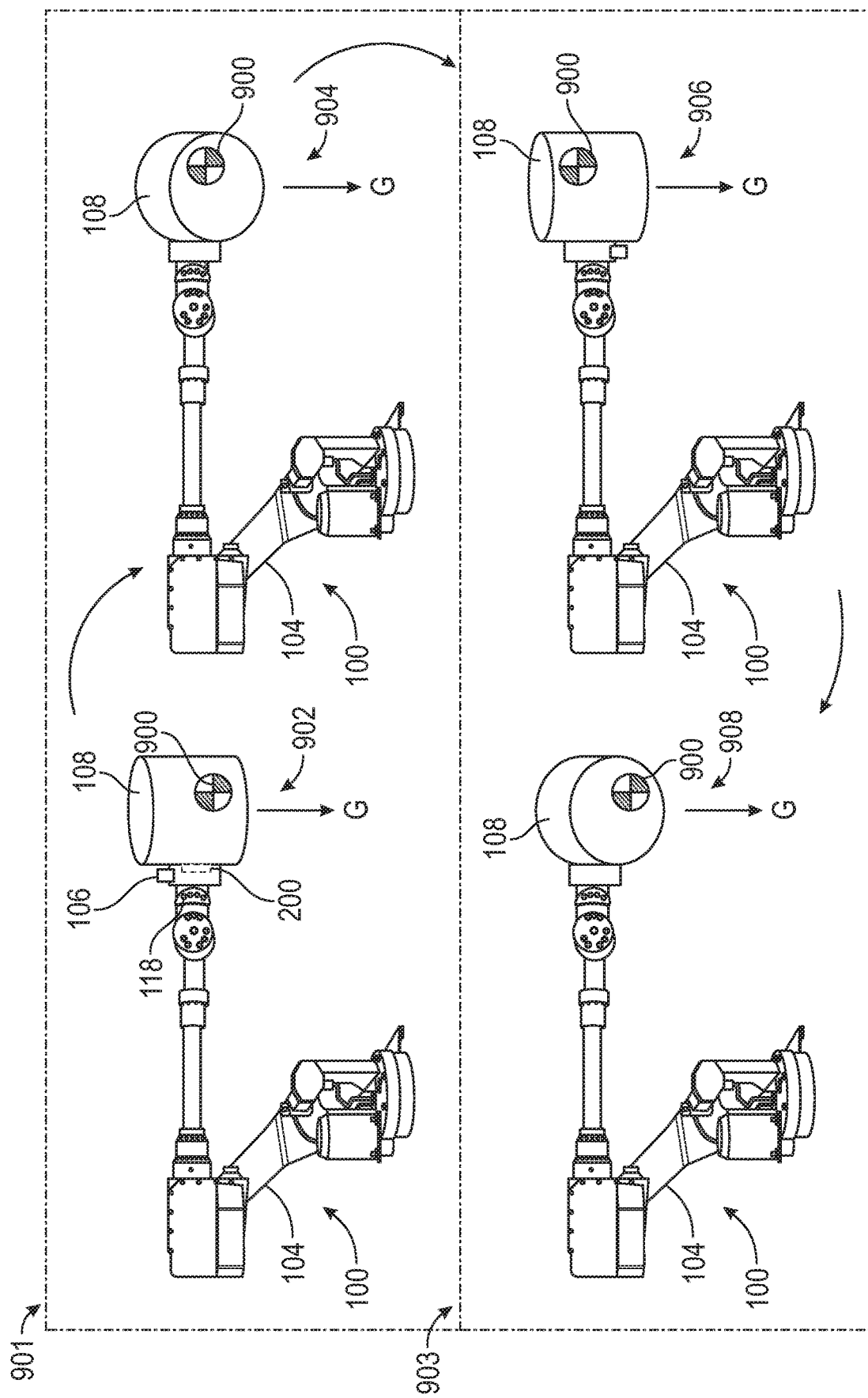
FIG. 9 is a schematic diagram of a manipulation and testing system implementing a testing scheme and a reverse load testing scheme.
Figure 10:
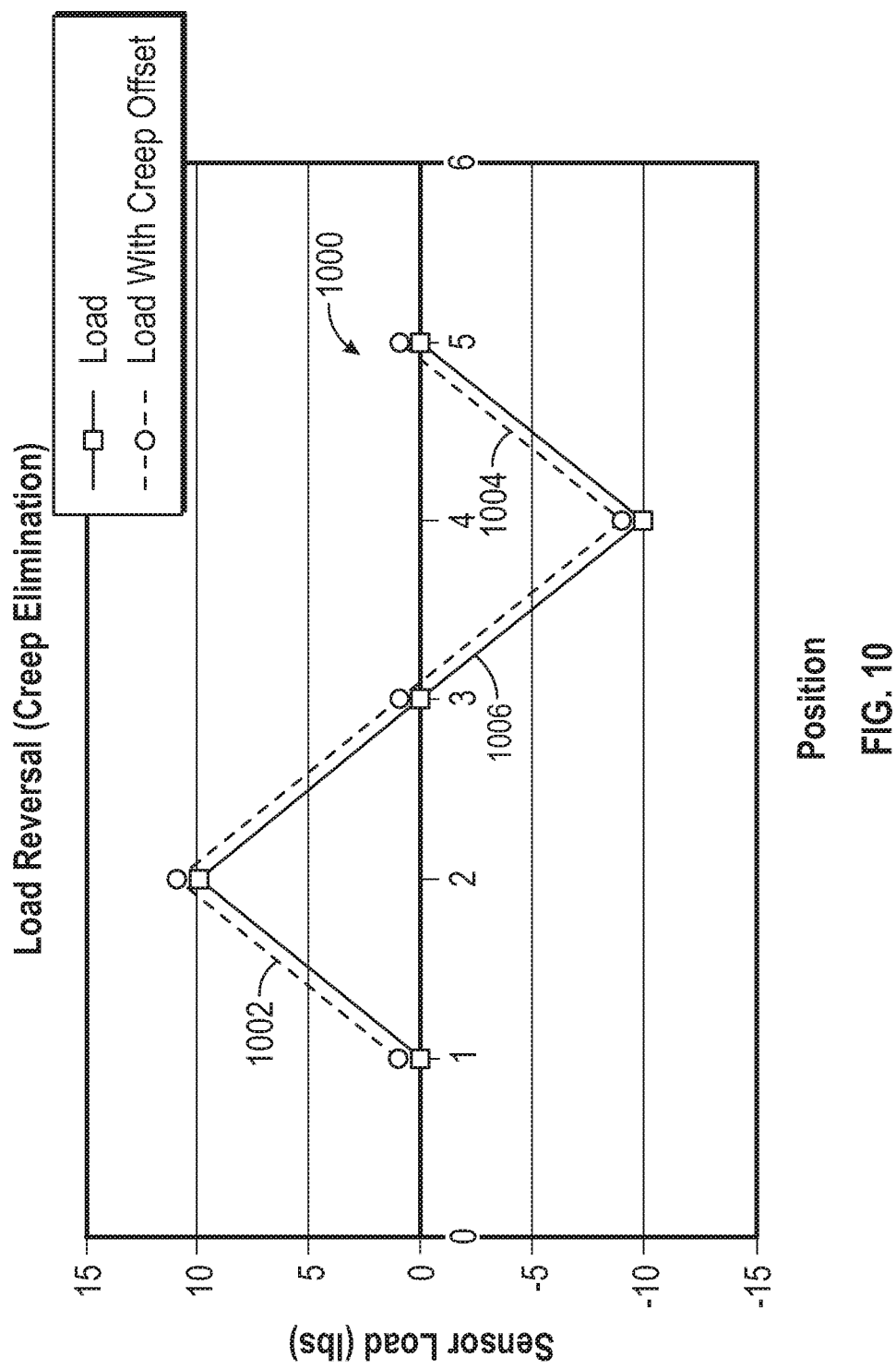
FIG. 10 is a plot of example force measurements based on the testing scheme and reverse load testing scheme of FIG. 9.

Load reversal schemes are one example of an error isolation scheme that applies converse loads to the mechanics sensor suite 200 for a work piece. As described herein, counterpart configurations for the load reversal scheme are inverse orientations and movements to the specified test configurations for a test scheme. The counterpart configurations load the sensor elements (e.g., like sensor element 800) of the mechanics sensor suite in a converse manner to the test configurations of the specified test scheme. By averaging the measured values for each of the test scheme and load reversal schemes creep deformation is isolated and removed from the resulting values. FIGS. 9 and 10 and the corresponding portions of the description provide examples of a load reversal scheme.

Repeatable test schemes are another type of error isolation scheme. In this example, the manipulation and testing system 100 implements a specified test scheme in multiple variations. The error isolation module 138 in this example varies a specified test scheme and generates matching variations of the test scheme to duplicate the specified testing. In examples the repeated test schemes are variations of the specified test scheme including one or more changes to the base test scheme, for instance the manipulator arm assembly 102 is rotated into a different initial configuration (e.g., 90 degrees relative to an initial position shown in FIG. 1A) about the base actuator 120. The work piece 108 is tested in each of test scheme and repeated (In this updated orientation the test scheme and repeated variation test schemes are implemented. Repeated testing in each of these schemes provides one or more supplemental sets of measured values that are compared to isolate one or more of alignment errors (e.g., relative to vertical or gravity) and accordingly remove errors caused by misalignment. The various orientations and movements for physical characteristic determinations provided herein are examples of test schemes, and variations including initial rotation of the manipulation and testing system prior to reimplementing the test scheme are examples of repeated test schemes.

Figure 12:
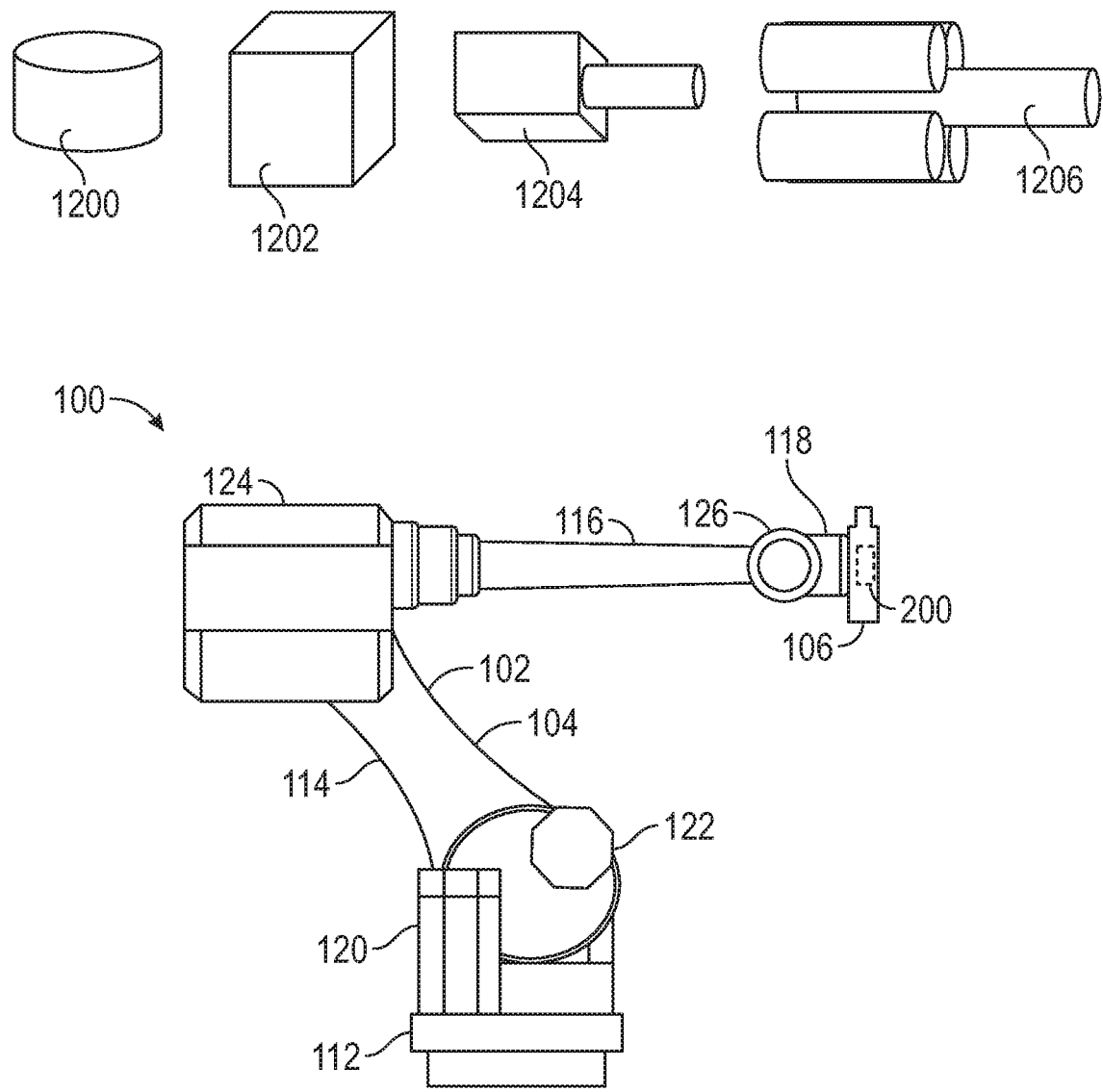
FIG. 12 is a schematic view of a manipulation and testing system including a plurality of example calibration units.
Figure 13:
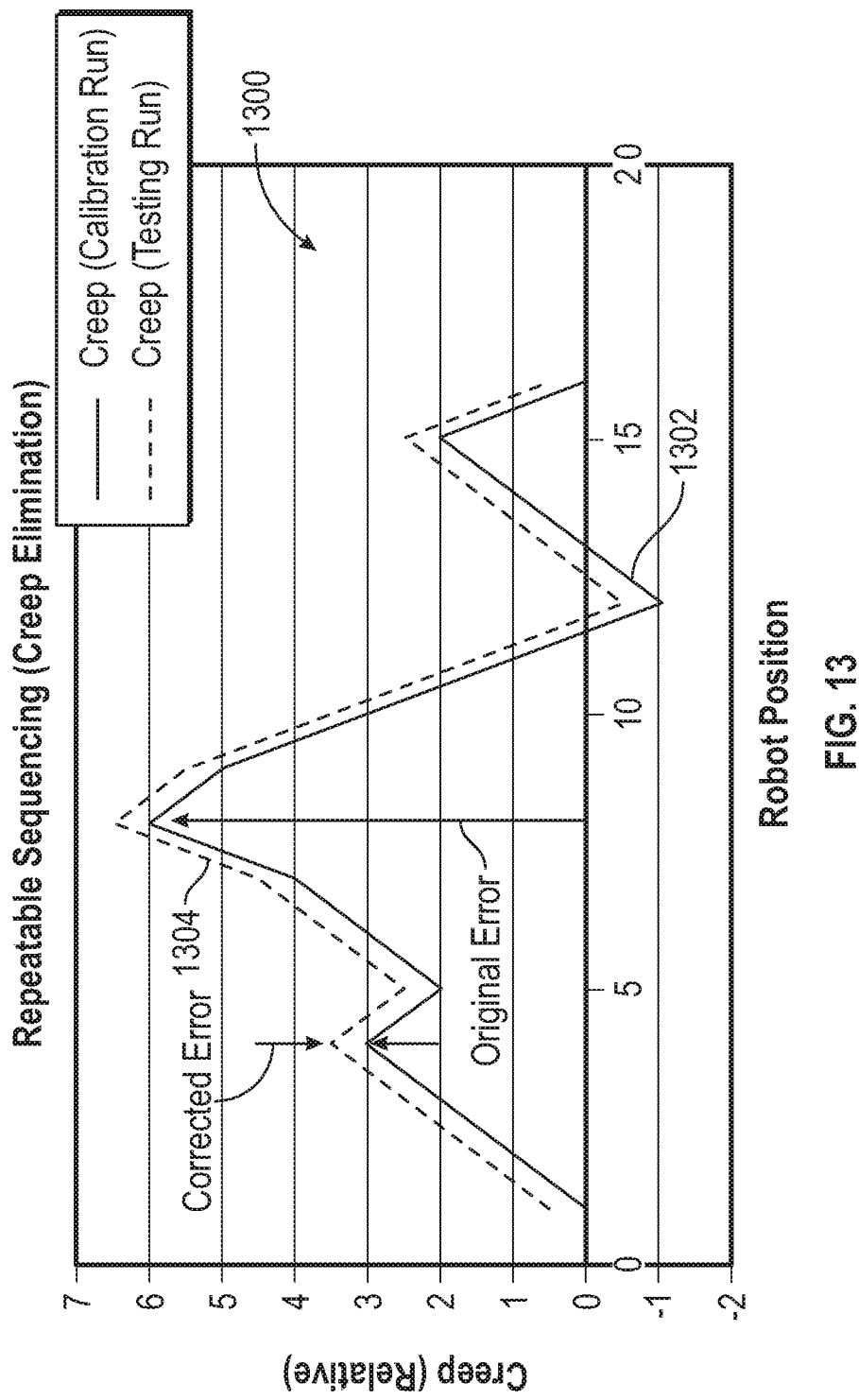
FIG. 13 is a plot of example creep responses for a calibration scheme with a calibration unit and testing scheme with a work piece.

In still other examples the error isolation module 139 includes one or more calibration schemes for use with one or more calibration units that are configured to substantially emulate one or more of the characteristics of the work piece 108 under evaluation. The values measured with the mechanics sensor suite 200 when using the calibration unit in a calibration scheme corresponding to the specified test scheme are compared to the values determined with the work piece 108 when implementing the specified test scheme. One or more errors, such as creep, are isolated by the comparison of values from measurements of the calibration unit and measurements of the work piece 108. Error common to the calibration and testing values is removed. FIGS. 12 and 13 and the corresponding portions of the description provide examples of calibration units and implementing of calibration schemes.

As previously described, the error isolation module 139 (see FIG. 1B) in various examples includes one or more error isolation schemes. One example of an error isolation scheme includes a load reversal scheme configured to provide counterpart configurations to the various orientations assumed by the work piece 108 during testing. The counterpart orientations are in one example inverse orientations to the testing configurations used in one or more of the test schemes. One example showing the implementation of a test scheme and load reversal scheme is provided in FIG. 9. The counterpart orientations in the lower portion of the Figure apply one or more reverse loads to the work piece 108 and are measured with the mechanics sensor suite 200. As will be described herein, the load reversal schemes are used in cooperation with the test schemes shown in the upper portion of FIG. 9 to isolate creep in the sensor elements of the mechanics sensor suite 200 and also account for one or more other possible vectors of error to either of the measurements or determination of physical characteristic including, but not limited to, cross talk.

Referring again to FIG. 9, each of a test scheme 901 and a reverse load test scheme 903 are implemented with the manipulation and testing system 100. The reverse load test scheme 903 provides counterpart test configurations relative to the test configurations of the test scheme 901. Implementation of the reverse load testing scheme 903 with the test scheme 901 as shown herein provides a plurality of test measurements as well as counterpart measurements used to isolate and remove the creep deformation of the mechanics sensor suite 200 including, for instance, the example sensor element 800 shown in FIG. 8.

Referring first to the test scheme 901, the manipulation and testing system 100 is shown with the work piece 108 coupled with the effector assembly 106 which is in turn coupled with the manipulator arm 104 of the system 100. The mechanics sensor suite 200 is configured to measure one or more of force, torque, motion or the like of the work piece 108 in one or more configurations such as the first and second test configurations 902, 904 shown in FIG. 9. For the purposes of this example the center of mass 900 is a known location to illustrate the corresponding positioning of the work piece 108 in each of the test configurations and counterpart test configurations.

In the first test configuration 902 with the cylinder of the work piece 108 oriented in a substantially vertical orientation relative to gravity one or more measurements are made in the first test configuration 902 including for instance force, torque, motion or the like. After evaluation at the first test configuration 902 the work piece 108 is reoriented into the second test configuration 904 shown in the view to the right for the test scheme 901. In this view the center of mass 900 is shown in a different position because of reorientation of the work piece 108 into an orthogonal position relative to that shown in the first test configuration 902. The measurements are taken again with the work piece 108 in the second test configuration 904.

The lower portion of FIG. 9 shows the reverse load test scheme 903 with the work piece 108 in counterpart configurations 906, 908 relative to the first and second test configurations 902, 904 described previously. For instance the work piece 108 is shown in a first counterpart test configuration 906 in the right portion of the lower half of FIG. 9. In this configuration the work piece 108 is oriented substantially 180 degrees relative to the first test configuration 902 of the test scheme 901. Accordingly the center of mass 900 is positioned in a converse position relative to that shown in the first test configuration 902. One or more counterpart measurements (to those taken in the first test configuration 902) are taken with the mechanics sensor suite 200 of the effector assembly 106. The work piece 108 is reoriented to a second counterpart test configuration 908 that is a counterpart configuration to the second test configuration 904 of the test scheme 901 described previously. The work piece 108 is oriented as shown with the center of mass 900 located at an opposed portion of the view relative to that shown for the second test configuration 904. The mechanics sensor suite 200 takes one or more counterpart measurements of the work piece 108 in the second counterpart test configuration 908 relative to the measurements made with the work piece in the second test configuration 904.

FIG. 10 shows one example of a load plot 1000 including a test scheme load plot 1002 and a reverse load plot 1004. Additionally FIG. 10 includes an ideal load plot 1006 including one or more load values measured with the mechanics sensor suite 200 without error, such as creep error included with the measurements. As shown in FIG. 10 each of the test scheme load plot 1002 and the reverse load plot 1004 varies relative to the ideal load plot 1006 by a small amount, in this example approximately one pound. Accordingly each of the measured values for the test scheme and reverse load plots 1002, 1004 vary a small amount relative to the ideal load plot 1006. This variation corresponds to creep deformation of the sensor elements of the mechanics sensor suite 200.

A governing equation for use with values measured as part of the test scheme and the reverse load plot adds the magnitude of both measured values and averages them to determine an adjusted value with creep isolated and removed.

$$AV = \frac{(MV_{TCn} - MV_{CCn+2})}{2}$$

AV is the adjusted value for a measurement with creep deformation removed. MV is the measured values in a test configuration (TC) and in a counterpart test configuration (CC) (adjusted for the reversed load with a negative) for corresponding positions n. In the example load plots 1002, 1004 the measured force values at positions 2 and 4 are respectively 11 and −9 pounds including creep deformation as shown by the variation from the ideal load plot 1006. When averaged with the governing equation the resulting adjusted force value for the work piece in position 2 and counterpart position 4) is 10 pounds, equivalent to the ideal load of 10 pounds for the ideal load plot 1006. Accordingly as shown in FIG. 10 and previously described and shown in FIG. 9 the implementation of a reverse load test scheme 903 providing a converse series of counterpart test configurations such as the counterpart test configurations 906, 908 facilitates the isolation and removal of creep error from one or more measurements with the mechanics sensor suite 200 including for instance one or more of force, torque, or other measurements including for instance motion such as position, velocity, acceleration or the like. Isolation and removal of error, such as creep error, is in one example conducted with the testing controller 138 including a comparator element 134 configured to compare measurements between the test and counterpart configurations, detect common error and remove the error.

In an ideal configuration cross talk force components are minimized (e.g., eliminated or are minimal sensed components) because the work piece 108 is coupled with the effector assembly 106 and aligned along a single specified axis with one or more sensor elements. In other examples the work piece 108 when measured with the mechanics sensor suite 200 as shown in FIG. 9 includes one or more force components that are measurable with the sensors and introduce cross talk error to measurements. In practice the work piece 108 is in some examples misaligned with one or more axes such as vertical, axes of sensor elements or the like. With misalignment of the work piece 108 relative to the sensor elements, secondary force, torque or motion components are measured in addition to primary measurement of interest (e.g., along a specified axis), such as the weight of the work piece 108 in the first or second test configurations 902, 904 as shown in FIG. 9.

Figure 11A:
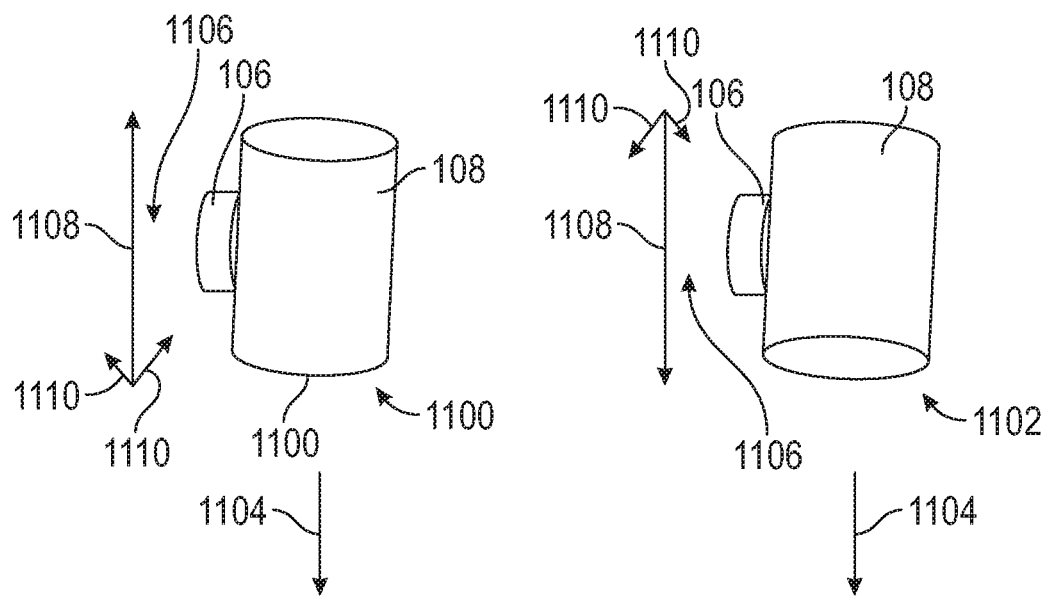
FIG. 11A is a schematic diagram in an example first test configuration of a test scheme and a first reverse load test configuration of a reverse load scheme.

In one example, the reverse load test scheme 903 shown in FIG. 9 is used to eliminate cross talk from the measured composite load of the work piece 108 in each of the first and second test configurations as well as the corresponding first and second counterpart test configurations 906, 908. FIG. 11A shows an example test configuration 1100 and counterpart configuration 1102 of the work piece 108. As further shown in FIG. 1A the work piece 108 is shown misaligned relative to a gravity vector 1104 (e.g., vertical). The misalignment of the work piece 108 is exaggerated for illustration purposes.

As further shown in FIG. 11A the work piece 108 in each of the configurations 1100, 1102 applies a composite load 1106 for instance to the mechanics sensor suite 200 (shown in FIG. 9) associated with the effector assembly 106. The composite load 1106 in one example includes, but is not limited to, one or more of force, torque, motion or the like having multiple component loads. As further shown in FIG. 11A the composite load 1106 includes in this example a primary load component 1108 (shown with the larger arrow of the composite load 1106) as well as one or more cross talk load components 1110 having a smaller magnitude relative to the primary load component 1108. In one example the primary load component 1108 is the component load that is of interest for a specified test scheme or a particular test configuration of a test scheme.

As further shown in FIG. 11A the work piece 108 is in the counterpart configuration 1102 in the right portion of the Figure and includes an inverse composite load 1106. Because the work piece 108 is moved through a reverse load test scheme (e.g., scheme 903 shown in FIG. 9) including the one or more counterpart test configurations the work piece 108 accordingly applies a corresponding inverse composite load 1106 to one or more of the sensors or sensor elements of the mechanics sensor suite 200. The primary load component 1108 of the inverse composite load 1106 has substantially an identical magnitude to the primary load component 1108 shown of the composite load 1106 in the test configuration 1100. Similarly the cross talk load components 1110 have identical magnitudes along opposite vectors relative to the cross talk load components 1110 shown in the first portion of FIG. 11A. Accordingly, the specified test scheme and reverse load test scheme for the test scheme facilitate the measurement of inversed and matching loads in each of the test and counterpart test configurations 1100, 1102.

Figure 11B:
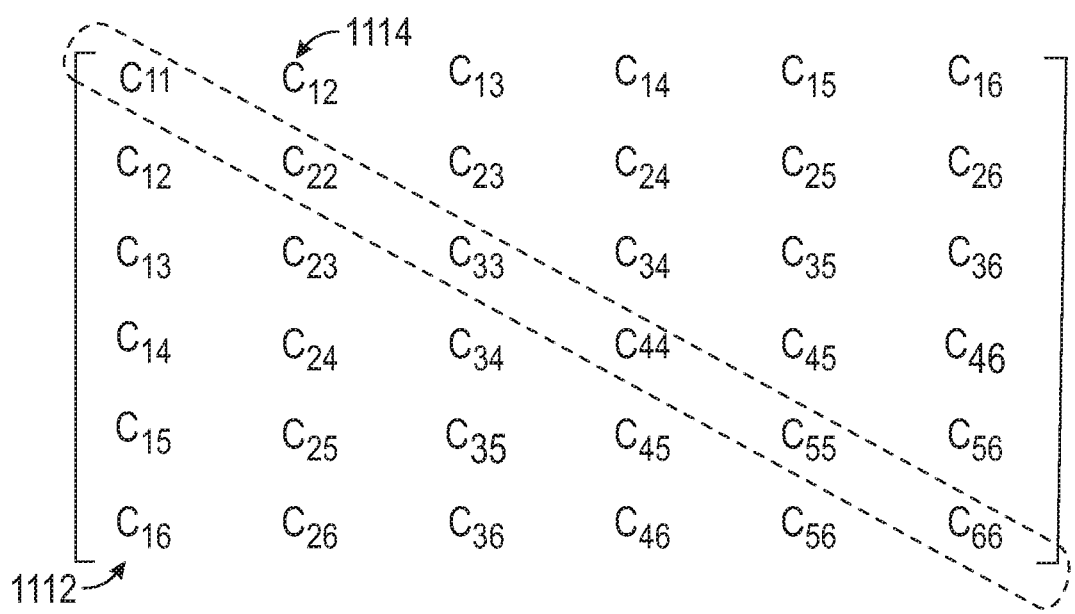
FIG. 11B is a symmetric matrix of a mechanical sensor for analytically isolating and removing cross talk with a testing scheme and a reverse load testing scheme.

FIG. 11B shows one example of a decoupling matrix 1112. The decoupling matrix is one example of a matrix array including one or more of the component forces previously described and shown for instance in FIG. 11A. In the example shown in FIG. 11B the decoupling matrix 1112 includes a plurality of component forces in addition to the components shown instance in FIG. 11A. In various examples the matrix component forces 1114 shown in FIG. 11B include forces detected and measured along one or more axes, degrees of freedom or the like, such as x, y or z axes, pitch, yaw or roll. As further shown in FIG. 11B the matrix component forces 1114 are populated in this example decoupling matrix 1112 in a 6×6 matrix. For instance, the components of the composite load 1106 measured for instance in the test configuration 1100 include primary and cross talk load components 1108, 1110. In one example the primary load components 1108 are measured and stored in the matrix component force locations for instance along the line of symmetry (shown in broken lines) corresponding in one example to the matrix locations of $C_{11}$, $C_{22}$ and so on in FIG. 11B. The cross talk load components 1110 are populated into the remaining locations of the decoupling matrix 1112 including for instance location $C_{12}$, $C_{23}$, $C_{25}$ and so on.

With the work piece 108 in the counterpart test configuration 1102 shown in the second view of FIG. 11A the effector assembly 106 including for instance the mechanics sensor suite 200 described herein measures one or more loads including for instance the component loads of the inverted composite load 1106 as shown in FIG. 11A. As previously described the composite load 1106 (inverted in this example because of the changed orientation of the work piece 108) includes inverse components of the primary load component 1108 as well as the cross talk load components 1110. These components are input to the corresponding locations of the decoupling matrix 1112. With a first and second decoupling matrix 1112 populated with values corresponding to the primary load components and cross talk load components 1108, 1110 in each of the test configuration 1100 and the counterpart test configuration 1102 matrix addition between the decoupling matrices 1112 facilitates the isolation and cancellation of cross talk load components 1110 from each of the overall composite loads 1106 measured with the mechanics sensor suite 200. Accordingly by way of addition of the decoupling matrices 1112 cross talk error (in addition to creep deformation error as previously described herein) is removed from measurements of the work piece 108 when the work piece is moved through each of a test configuration 1100 and counterpart test configuration 1102 associated with each of a test scheme and a reverse load test scheme as previously described herein. Accordingly the resulting load measured with the work piece 108 in each of the test configuration 1100 and the counterpart test configuration 1102 provides a refined load measurement that eliminates one or more cross talk load components 1110 from the overall value to thereby provide an enhanced refined value for the load under question (e.g., force, torque, motion or the like).

FIG. 12 shows another example of the manipulation and testing system 100 previously described and shown in FIGS. 1A, 1B. In the schematic view provided in FIG. 12 the manipulation and testing system includes a manipulator arm 104 and an effector assembly 106. In one example the effector assembly 106 is integral to the manipulator arm 104 or a separate component. The effector assembly 106 further includes the mechanics sensor suite 200 having one or more sensors configured to measure one or more of force, torque, motion or the like of the work piece 108 during testing. As previously described and schematically shown in FIG. 8 one or more of the sensor elements 800 of the mechanics sensor suite 200 deforms in one example through creep deformation. As described herein, creep deformation introduces a form of error into one or more measurements made with the mechanics sensor suite 200. The testing controller 128 includes an error isolation module 139 configured to operate together with a test scheme module 138 to isolate and remove one or more forms of error from measurements taken with the mechanics sensor suite 200 or one or more physical characteristics determined based on the measurements made with the mechanics sensor suite 200.

FIG. 12 shows the system 100 including a plurality of calibration units 1200, 1202, 1204 and 1206 used with calibration schemes as another mechanism for isolating and removing error based on creep deformation (e.g., in addition or as an alternative to reverse loading schemes). In the example shown in FIG. 12 the various calibration units 1200, 1202, 1204, 1206 include one or more of mass, shape, volume or material that matches (e.g., is similar or identical) the corresponding features of the work piece 108. Optionally the calibration units 1200-1206 have corresponding shapes, sizes, materials, mass or the like to work pieces under investigation, and thereby include corresponding centers of mass, moments of inertia or the like relative to work pieces under investigation. In still other examples, the calibration units 1200-1206 include previously assessed identical or near identical work pieces 108. For instance, the calibration schemes include testing schemes previously conducted on preceding work pieces 108, and the previous measurements from the testing schemes are used as the calibration values for isolation and removal of creep based error when testing a current work piece 108.

In an example the error isolation module 139 (see FIG. 1B) includes one or more calibration schemes configured to move one or more of the corresponding calibration units 1200-1206 through a series of calibration configurations corresponding to the one or more test configurations for the specified test scheme (e.g., from the test scheme module 138). Stated another way, prior to analysis of the work piece 108 with the manipulation and testing system 100 a corresponding calibration unit such as one or more of the calibration units 1200-1206 having one or more matching (similar or identical) properties to the work piece including one or more mass, shape, material or the like is coupled with the effector assembly 106 and moved through and analyzed with a calibration scheme corresponding to the various test configurations of the specified test scheme. For instance, for a center of mass determination the calibration unit is moved through each or one or more of the corresponding test configurations shown in FIG. 5AE.

In another example, with a testing scheme configured to determine one or more moments of inertia of the work piece 108 the corresponding calibration unit is moved through each of the various configurations including motion in the various configurations to measure one or more corresponding physical characteristics (including moments of inertia, force, torque, motion or the like) of the calibration unit prior to implementing the test scheme with the work piece 108.

FIG. 13 shows an example creep plot 1300 including plots of each of a calibration plot 1302 and a test plot 1304 with the work piece 108. As shown in FIG. 13 each of the calibration plot 1302 and the test plot 1304 using the work piece are similar but not identical. As previously described, the calibration unit 1200-1206 used for the calibration scheme match one or more properties of the work piece 108 under investigation (includes a similar mass, volume, materials, shape or the like). For the work piece 108, a similar calibration unit is 1200. Movement of the calibration unit 1200 through the calibration scheme generates the calibration plot 1302 that is similar to the creep deformation obtained with the test plot 1304 using the work piece 108.

In an example these values (whether plotted or numerical) are compared. Creep deformation that is common to each of the calibration plot 1302 and the test plot 1304 is identified and removed, for instance with the comparator element 134 of the testing controller 128. For instance, common creep deformation between each of the calibration plot 1302 and the test plot 1304 is identified (see the original error notation in FIG. 13), isolated and removed from measurements taken with the mechanics sensor suite 200. As shown in FIG. 13 without the correction provided with the calibration scheme (plot 1302) in combination with test scheme (plot 1304) creep error corresponding to the original error shown in FIG. 13 is included with one or more of the measurements made with the mechanics sensor suite 200. Conversely, with the error isolation scheme described herein including a calibration scheme with one or more of the calibration units 1200-1206 corresponding to the work piece creep deformation is minimized to the minimal (relative to the original error) corrected error shown in FIG. 13. The creep response of the calibration scheme shown with the calibration plot 1302 is subtracted from the creep response of the test plot 1304 (e.g., with the comparator element 134 shown in FIG.

1B) to minimize the inclusion of creep deformation error into the values measured with the mechanics sensor suite 200.

Additionally, the implementation of a calibration scheme facilitates the isolation and removal (including minimizing) of one or more other forms of error in addition to creep deformation in measurements of the work piece 108 with the mechanics sensor suite 200. Additional forms of error that are eliminated (e.g., minimized or eliminated) with implementation of a calibration scheme as described herein include, but are not limited to, non-linearity of the sensor response of one or more of the sensors, cross talk as previously described herein between various components of the sensors or the like. For example, the mechanics sensor suite 200 collects calibration and test (or base) measurements of one or more of force, torque or motion while conducting the calibration scheme and corresponding test scheme. The testing controller 128 including the error isolation module 139 and the comparator element 134 (see FIG. 1B) compares the test (base) and calibration measurements, and isolates non-linearity based on the approximately similar measurements. Non-linearity otherwise present across the entire sensor range is effectively removed from consideration by focusing on the similar measurements taken in each of the calibration and test schemes. For instance, in one example the non-linearity error based on calibration and test measurements of 10 Nm and 11 Nm, respectively, is approximately 0.001 Nm (assuming a sensor non-linearity of 0.001). In contrast, non-linearity based on the entire operating range of a torque sensor is an order of magnitude or more larger. For example, with an operating range of 20 Nm to 0 Nm and the same sensor non-linearity, the resulting non-linearity error is ±0.02 Nm. In still other examples the error isolation module 139 communicates with one or more mechanical systems associated with the effector assembly 106 and configured to enhance the accuracy of one or more of the sensors, for instance a torque sensor of the mechanics sensor suite 200. As previously described herein the effector assembly 108 optionally includes an adjustable ballast system 202 interposed between one or more features of the effector assembly 106 including for instance the mechanics sensor suite 200 and the work piece 108. The adjustable ballast system 202 is operated to move a counter ballast 210 (see FIG. 4) relative to the work piece 108. A composite center of mass of a composite assembly including the counter ballast 210 and the work piece 108 is moved near to or approximate the mechanics sensor suite 200 through movement of the counter ballast 210. The positioning of the composite center of mass proximate to the suite 200 minimizes torque incident on the torque sensor of the mechanics sensor suite 200. By minimizing torque at the mechanics sensor suite 200 an operational range of the torque sensor is minimized and actual error is decreased while accuracy is correspondingly increased to enhance torque measurements with the mechanics sensor suite 200.

Figure 14A:
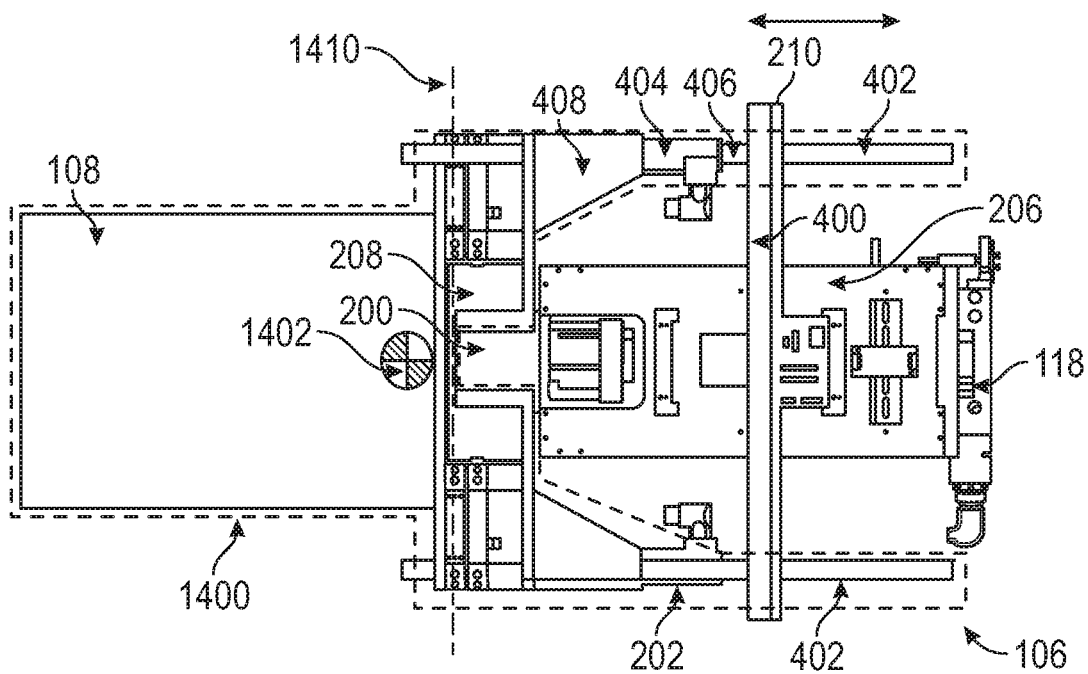
FIG. 14A is a cross sectional view of an example effector assembly including the adjustable ballast system of FIG. 4.
Figure 14B:
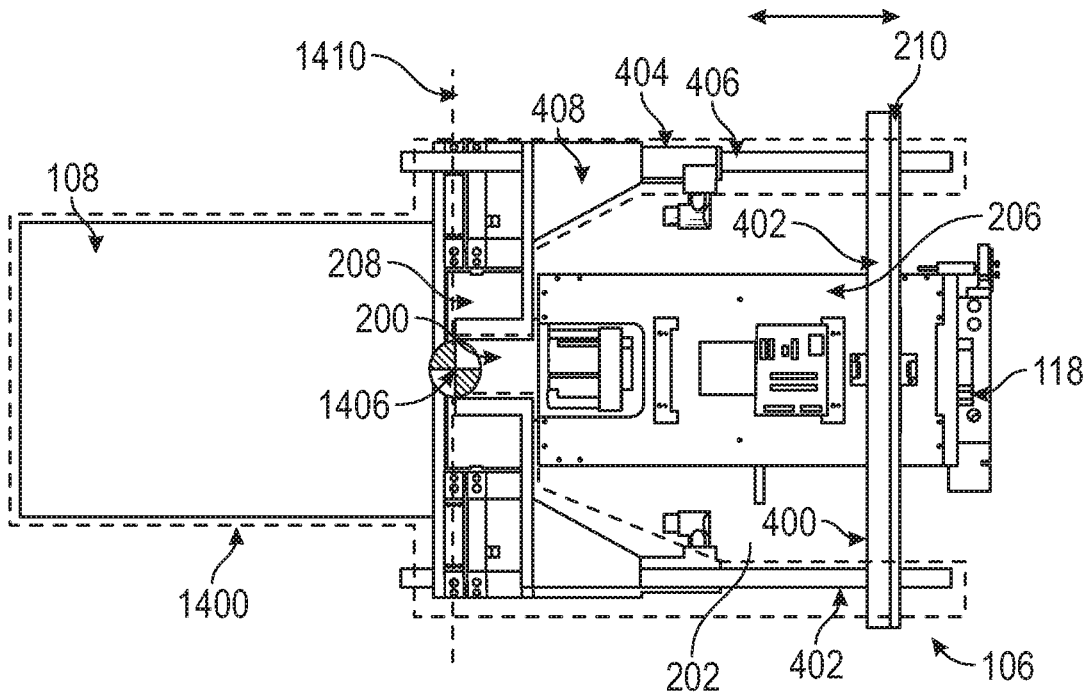
FIG. 14B is a cross sectional view of the effector assembly of FIG. 13A with an adapted center of mass proximate a mechanics sensor suite.

FIGS. 14A and 14B show schematic views of the effector assembly 106 including the work piece 108 coupled with the sensor interface 208 of the adjustable ballast system 202. The adjustable ballast system 202 is interposed between the work piece 108 and the remainder of the effector assembly 106. FIGS. 14A B schematically illustrate one example of operation of the adjustable ballast system 202 to position the composite center of mass 1402 of a composite assembly 1400 of the work piece 108 and the counter ballast 210 proximate to a sensing plane 1410 or a mechanics sensor suite 200 having the sensing plane 1410. Positioning of the composite center of massage 1402 proximate to either or both of the mechanics sensor suite 200 or the sensing plane 1410 facilitates the use of one or more torque sensors having a minimized operating range and a corresponding minimized error.

Referring now to FIG. 14A the effector assembly 106 includes the adjustable ballast system 202 coupled with the mechanics sensor suite 200. As shown, the adjustable ballast system 202 extends rearwardly along the effector frame 206 with one or more counter ballast components 210. In the example shown in FIG. 14A the counter ballast 210 includes one or more of the carriage 400 as well as an additional counter ballast buckled or coupled with the carriage 400. In another example the carriage 400 comprises the only counter ballast coupled with the ballast actuator 404 and the guides 402.

As previously discussed herein and shown again in FIG. 14A the counter ballast 210 is coupled with one or more ballast actuators 404. The ballast actuators 404 are coupled with the counter ballast 210 with one or more drive shafts 406 configured to move the counter ballast 210 translationally, for instance toward or away from the mechanics sensor suite 200 and the work piece 108. As also shown in FIG. 14A one or more guides 402 are provided to guide and constrain movement of the counter ballast 210 to translational movement and minimize binding or seizing of the counter ballast 210.

Referring again to FIG. 14A, a composite assembly 1400 includes the work piece 108 and components of the adjustable ballast system 202 such as the ballast bracket 408 and the counter ballast 210. With the counter ballast 210 in the position shown in FIG. 14A center of mass 1402 is shown offset relative to the sensing plane 1410 of the mechanics sensor suite 200. Accordingly, in this configuration the mechanics sensor suite 200 including the one or more torque sensors experiences increased torque because the center of mass 1402 is offset and applies a moment at the mechanics sensor suite 200.

Referring now to FIG. 14B the counter ballast 210 is shown in a second configuration. In the second configuration the counter ballast 210 is translated relatively away from the configuration in FIG. 14A and is thereby remote relative to the original position. In one example, the testing controller 128 operates the adjustable ballast system 202 in cooperation with the mechanics sensor suite 200. For instance, the adjustable ballast system 202 is operated by the testing controller 128 (e.g., one or more of the test scheme module or error isolation module 138, 139) to move the counter ballast 210 and at the same time measure the torque at the mechanics sensor suite 200. The counter ballast 210 is moved translationally relative to the mechanics sensor suite 200 until a minimized torque value is measured with the mechanics sensor suite 200. At this minimal torque value the adapted center of mass 1406 (the repositioned composite center of mass 1402 in FIG. 14A) of the composite assembly 1400 is proximate to the mechanics sensor suite 200 including for instance the sensing plane 1410. Optionally, the adapted center of mass 1406 in proximity to the mechanics sensor suite 200 or the sensing plane 1410 includes, but is not limited to, alignment of the adapted center of mass 1406 with the sensing plane 1410 or proximate positioning of the adapted center of mass 1406 immediately adjacent to the sensing plane 1410. In this configuration in FIG. 14B the torque experienced by the mechanics sensor suite 200 is minimized relative to the configuration shown in FIG. 14A. The minimized torque measurements facilitated with the adjustable ballast system 202 allows for the inclusion of torque sensors in the mechanics sensor suite 200 having a minimized operating range while permitting torque measurements of work pieces having masses of hundreds or thousands of pounds. The minimized operating ranges of torque sensors decreases the maximum error realized with the mechanics sensor suite 200 with regard to at least torque sensing.

Because the counter ballast 210 is movable relative to the remainder of the adjustable ballast system 202 and the effector assembly 106 staggered operation including one or more of the addition or subtraction of ballast to one or more components of the effector assembly 106 is avoided. Instead, the counter ballast 210 including one or more counter ballast plates, counter ballast components or the like are provided from the outset of adjustment of the center of mass 1402 of the composite assembly 1400 to the adapted center of mass 1406. Once the adjustable ballast system 202 begins operation the system 202 positions counter ballast 210 and accordingly moves the adapted center of mass 1406 proximate to the sensing plane 1410 of the mechanics sensor suite 200 without pauses previously required for the addition or substraction of supplemental weights. Instead, the counter ballast 210 is automatically moved by the one or more ballast actuators 404 in a continuous manner along the drive shafts 406 and guides 402, for instance with a high or infinite resolution according to the resolution of the movement of the ballast actuator 404 to move the counter ballast 210 along the guides 402.

Various Notes and Aspects

Example 1 can include subject matter such as a method for automatically identifying at least one physical characteristic of a work piece comprising: selecting at least one test scheme for determining the at least one physical characteristic, each test scheme including one or more test configurations; selecting at least one error isolation scheme, the at least one error isolation scheme includes: a load reversal scheme including one or more counterpart test configurations to the one or more test configurations of the selected at least one test scheme; implementing each of the selected at least one test scheme and the at least one error isolation scheme, implementing includes: moving the work piece through the one or more test configurations of the selected at least one test scheme, and measuring one or more of base force, torque, or motion for the work piece with a sensor suite in the one or more test configurations; and moving the work piece through the one or more counterpart test configurations of the selected at least one error isolation scheme, and measuring one or more of counterpart force, torque or motion for the work piece with the sensor suite in the one or more counterpart test configurations; and identifying the at least one physical characteristic of the work piece based on the selected at least one test scheme, identifying the physical characteristic includes: isolating error common to one or more of the measured base and counterpart force, torque or motion including at least creep error; determining one or more of refined force, torque or motion by removing the isolated error including at least one of creep, cross-talk, temperature drift or non-linearity error from one or more of the measured base force, torque or motion; and determining the at least one physical characteristic according to the one or more refined force, torque or motion.

Example 2 can include, or can optionally be combined with the subject matter of Example 1, to optionally include coupling the work piece to a manipulator arm assembly including the sensor suite.

Example 3 can include, or can optionally be combined with the subject matter of one or any combination of Examples 1 or 2 to optionally include wherein coupling the work piece to the manipulator arm assembly includes coupling the work piece to an effector assembly interposed between the work piece and the remainder of the manipulator arm assembly, the effector assembly includes the sensor suite.

Example 4 can include, or can optionally be combined with the subject matter of one or any combination of Examples 1-3 to optionally include wherein selecting the at least one test scheme includes selecting at least one of: a center of mass test scheme having at least two test configurations including different orientations of the work piece; a moment of inertia test scheme having at least one test configuration including orientation of the work piece along a specified axis and rotation of the work piece around the specified axis; and a center of mass and moment of inertia test scheme having at least two test configurations including orientations of the work piece along at least two specified axes and rotation of the work piece around each of the specified axes.

Example 5 can include, or can optionally be combined with the subject matter of one or any combination of Examples 1-4 to optionally include wherein the one or more counterpart test configurations include one or more reverse load configurations of the load reversal scheme that are inverse to the respective one or more test configurations of the selected at least one test scheme; and implementing the at least one error isolation scheme includes moving the work piece through the one or more reverse load configurations.

Example 6 can include, or can optionally be combined with the subject matter of Examples 1-5 to optionally include wherein determine the one or more refined force, torque or motion includes canceling coupled signal components of the measured base force, torque or motion with opposed coupled signal components of the measured counterpart force, torque or motion.

Example 7 can include, or can optionally be combined with the subject matter of Examples 1-6 to optionally include wherein isolating error common to one or more of the measured base and calibration force, torque or motion includes isolating one or more of creep error of sensors at the sensor suite, cross talk between sensor elements of the sensors, alignment error or concentricity.

Example 8 can include, or can optionally be combined with the subject matter of Examples 1-7 to optionally include wherein selecting the at least one error isolation scheme based on the selected at least one test scheme, the at least one error isolation scheme includes: a calibration scheme including one or more calibration configurations for a calibration unit, the one or more calibration configurations correspond to the one or more test configurations of the at least one test scheme.

Example 9 can include, or can optionally be combined with the subject matter of Examples 1-8 to optionally include wherein implementing the at least one error isolation scheme includes: moving the calibration unit through the one or more calibration configurations of the calibration scheme, and measuring one or more of calibration force, torque, or motion for the calibration unit with the sensor suite in the one or more calibration configurations; and identifying the at least one physical characteristic of the work piece based on the selected at least one test scheme includes: isolating error common to one or more of the measured base and calibration force, torque or motion.

Example 10 can include, or can optionally be combined with the subject matter of Examples 1-9 to optionally include wherein isolating error common to one or more of the measured base and calibration force, torque or motion includes isolating creep error of sensors at the sensor suite.

Example 11 can include, or can optionally be combined with the subject matter of Examples 1-10 to optionally include wherein the calibration unit includes another work piece, and the calibration scheme and one or more calibration configurations match the selected at least one test scheme and the one or more test configurations.

Example 12 can include, or can optionally be combined with the subject matter of Examples 1-11 to optionally include wherein selecting the at least one error isolation scheme based on the selected at least one test scheme, the at least one error isolation scheme includes: a counter ballast scheme including movement of a counter ballast movably coupled with the work piece relative to the sensor suite and the work piece.

Example 13 can include, or can optionally be combined with the subject matter of Examples 1-12 to optionally include wherein implementing the at least one error isolation scheme includes: moving the counter ballast movably coupled with the work piece relative to the sensor suite, and minimizing a moment at the sensor suite according to the moving of the counter ballast.

Example 14 can include, or can optionally be combined with the subject matter of Examples 1-13 to optionally include wherein a composite assembly includes the work piece and the counter ballast, and implementing the at least one error isolation scheme includes: moving the counter ballast slidably coupled with the work piece relative to the work piece, and aligning a center of mass of the composite assembly with a sensing plane of the sensor suite according to the moving of the counter ballast.

Example 15 can include, or can optionally be combined with the subject matter of Examples 1-14 to optionally include a manipulation and testing system configured for manipulation of a work piece and determination of at least one physical characteristic of the work piece, the system comprising: a manipulator arm assembly including a work piece interface; a sensor suite associated with the manipulator arm assembly and configured to measure one or more of force, torque or motion of the work piece; and a testing controller in communication with the manipulator arm assembly, the testing controller includes: a test scheme module including at least one test scheme for determining the at least on physical characteristic, each test scheme includes one or more test configurations; an error isolation module including at least one error isolation scheme, the error isolation module includes at least a load reversal scheme including one or more counterpart test configurations to the one or more test configurations; and a physical characteristic determination module in communication with the manipulator arm assembly, the physical characteristic determination module includes: an implementing element configured to operate the manipulator arm assembly through the test and counterpart test configurations; a measurement element configured to collect base and counterpart measurements including one or more of base and counterpart forces, torques or motions for the work piece in the test and counterpart test configurations, respectively; a comparator element configured to compare the base and counterpart measurements, isolate common error therebetween and remove common error from the base measurements; and a determination element configured to determine the at least one physical characteristic of the work piece according to the base measurements having the common error removed.

Example 16 can include, or can optionally be combined with the subject matter of Examples 1-15 to optionally include the manipulator arm assembly, the work piece interface configured to grasp and hold the work piece while the manipulator arm assembly moves the work piece through the test and counterpart test configurations.

Example 17 can include, or can optionally be combined with the subject matter of Examples 1-16 to optionally include wherein the manipulator arm assembly includes an effector assembly interposed between the work piece and the remainder of the manipulator arm assembly, and the effector assembly includes the sensor suite.

Example 18 can include, or can optionally be combined with the subject matter of Examples 1-17 to optionally include wherein the test scheme module includes: a center of mass test scheme having at least two test configurations including different orientations of the work piece; a moment of inertia test scheme having at least one test configuration including orientation of the work piece along a specified axis and rotation of the work piece around the specified axis; and a center of mass and moment of inertia test scheme having at least two test configurations including orientations of the work piece along at least two specified axes and rotation of the work piece around each of the specified axes.

Example 19 can include, or can optionally be combined with the subject matter of Examples 1-18 to optionally include wherein the one or more counterpart test configurations include one or more reverse load configurations of the load reversal scheme that are inverse to the respective one or more test configurations of the selected at least one test scheme.

Example 20 can include, or can optionally be combined with the subject matter of Examples 1-19 to optionally include wherein the comparator element is configured to remove common error from the base measurements including coupled signal components of the base measurements and opposed coupled signal components of the counterpart measurements.

Example 21 can include, or can optionally be combined with the subject matter of Examples 1-20 to optionally include wherein the comparator element is configured to compare the base and counterpart measurements, isolate common error between the base and counterpart measurements including one or more of creep error of sensors at the sensor suite, cross talk between sensor elements of the sensors, alignment error or concentricity.

Example 22 can include, or can optionally be combined with the subject matter of Examples 1-21 to optionally include at least one calibration unit approximating a profile and mass of the work piece; and the error isolation module includes: a calibration scheme including one or more calibration configurations for the calibration unit, the one or more calibration configurations correspond to the one or more test configurations of the at least one test scheme Example 23 can include, or can optionally be combined with the subject matter of Examples 1-22 to optionally include wherein the implementing element s configured to move the calibration unit through the one or more calibration configurations of the calibration scheme; the measurement element is configured to collect calibration measurements including one or more of calibration force, torque, or motion for the calibration unit in the one or more calibration configurations; the comparator element is configured to compare the base and calibration measurements, isolate common creep error therebetween and remove common creep error from the base measurements; and the determination element is configured to determine the at least one physical characteristic of the work piece according to the base measurements having the common creep error removed.

Example 24 can include, or can optionally be combined with the subject matter of Examples 1-23 to optionally include wherein the calibration unit includes another work piece, and the calibration scheme and one or more calibration configurations match the selected at least one test scheme and the one or more test configurations.

Example 25 can include, or can optionally be combined with the subject matter of Examples 1-24 to optionally include an adjustable ballast system coupled with one or more of the manipulator arm assembly or the work piece, the adjustable ballast system includes: a sensor interface coupled with the sensor suite; at least one rail extending away from the sensor suite; and a counter ballast slidably coupled along the at least one rail, the counter ballast movable toward and away from the sensor suite along the at least one rail, and the counter ballast and the work piece are components of a composite assembly.

Example 26 can include, or can optionally be combined with the subject matter of Examples 1-25 to optionally include wherein the error isolation module includes: a counter ballast scheme configured to move the counter ballast relative to the sensor suite and align a center of mass of the composite assembly with a sensing plane of the sensor suite.

Example 27 can include, or can optionally be combined with the subject matter of Examples 1-26 to optionally include wherein the adjustable ballast system includes a ballast actuator coupled with one or more of the counter ballast or the at least one rail, and the ballast actuator is configured to move the counter according to the counter ballast scheme.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times, Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for automatically identifying at least one physical characteristic of a work piece comprising:
   selecting at least one test scheme for determining the at least one physical characteristic, each test scheme including one or more test configurations;
   selecting at least one error isolation scheme, the at least one error isolation scheme includes:

a load reversal scheme including one or more counterpart test configurations to the one or more test configurations of the selected at least one test scheme;

implementing each of the selected at least one test scheme and the at least one error isolation scheme, implementing includes:

moving the work piece through the one or more test configurations of the selected at least one test scheme, and measuring one or more of base force, torque, or motion for the work piece with a sensor suite in the one or more test configurations; and moving the work piece through the one or more counterpart test configurations of the selected at least one error isolation scheme, and measuring one or more of counterpart force, torque or motion for the work piece with the sensor suite in the one or more counterpart test configurations; and identifying the at least one physical characteristic of the work piece based on the selected at least one test scheme, identifying the physical characteristic includes:

isolating error common to one or more of the measured base and counterpart force, torque or motion including at least creep error;

determining one or more of refined force, torque or motion by removing the isolated error including at least one of creep, cross-talk, temperature drift or non-linearity error from one or more of the measured base force, torque or motion; and determining the at least one physical characteristic according to the one or more refined force, torque or motion.

2. The method of claim 1 comprising coupling the work piece to a manipulator arm assembly including the sensor suite.

3. The method of claim 2, wherein coupling the work piece to the manipulator arm assembly includes coupling the work piece to an effector assembly interposed between the work piece and the remainder of the manipulator arm assembly, the effector assembly includes the sensor suite.

4. The method of claim 1, wherein selecting the at least one test scheme includes selecting at least one of:

a center of mass test scheme having at least two test configurations including different orientations of the work piece;

a moment of inertia test scheme having at least one test configuration including orientation of the work piece along a specified axis and rotation of the work piece around the specified axis; and a center of mass and moment of inertia test scheme having at least two test configurations including orientations of the work piece along at least two specified axes and rotation of the work piece around each of the specified axes.

5. The method of claim 1, wherein the one or more counterpart test configurations include one or more reverse load configurations of the load reversal scheme that are inverse to the respective one or more test configurations of the selected at least one test scheme; and implementing the at least one error isolation scheme includes moving the work piece through the one or more reverse load configurations.

6. The method of claim 5, wherein determine the one or more refined force, torque or motion includes canceling coupled signal components of the measured base force, torque or motion with opposed coupled signal components of the measured counterpart force, torque or motion.

7. The method of claim 1, wherein isolating error common to one or more of the measured base and calibration force, torque or motion includes isolating one or more of creep error of sensors at the sensor suite, cross talk between sensor elements of the sensors, alignment error or concentricity.

8. The method of claim 1, wherein selecting the at least one error isolation scheme based on the selected at least one test scheme, the at least one error isolation scheme includes:

a calibration scheme including one or more calibration configurations for a calibration unit, the one or more calibration configurations correspond to the one or more test configurations of the at least one test scheme.

9. The method of claim 8, wherein implementing the at least one error isolation scheme includes:

moving the calibration unit through the one or more calibration configurations of the calibration scheme, and measuring one or more of calibration force, torque, or motion for the calibration unit with the sensor suite in the one or more calibration configurations; and identifying the at least one physical characteristic of the work piece based on the selected at least one test scheme includes:

isolating error common to one or more of the measured base and calibration force, torque or motion.

10. The method of claim 9, wherein isolating error common to one or more of the measured base and calibration force, torque or motion includes isolating creep error of sensors at the sensor suite.

11. The method of claim 8, wherein the calibration unit includes another work piece, and the calibration scheme and one or more calibration configurations match the selected at least one test scheme and the one or more test configurations.

12. The method of claim 1, wherein selecting the at least one error isolation scheme based on the selected at least one test scheme, the at least one error isolation scheme includes:

a counter ballast scheme including movement of a counter ballast movably coupled with the work piece relative to the sensor suite and the work piece.

13. The method of claim 12, wherein implementing the at least one error isolation scheme includes:

moving the counter ballast movably coupled with the work piece relative to the sensor suite, and minimizing a moment at the sensor suite according to the moving of the counter ballast.

14. The method of claim 12, wherein a composite assembly includes the work piece and the counter ballast, and implementing the at least one error isolation scheme includes:

moving the counter ballast slidably coupled with the work piece relative to the work piece, and aligning a center of mass of the composite assembly with a sensing plane of the sensor suite according to the moving of the counter ballast.

15. A manipulation and testing system configured for manipulation of a work piece and determination of at least one physical characteristic of the work piece, the system comprising:

a manipulator arm assembly including a work piece interface;

a sensor suite associated with the manipulator arm assembly and configured to measure one or more of force, torque or motion of the work piece; and a testing controller in communication with the manipulator arm assembly, the testing controller includes:

a test scheme module including at least one test scheme for determining the at least on physical characteristic, each test scheme includes one or more test configurations;

an error isolation module including at least one error isolation scheme, the error isolation module includes at least a load reversal scheme including one or more counterpart test configurations to the one or more test configurations; and a physical characteristic determination module in communication with the manipulator arm assembly, the physical characteristic determination module includes:

an implementing element configured to operate the manipulator arm assembly through the test and counterpart test configurations;

a measurement element configured to collect base and counterpart measurements including one or more of base and counterpart forces, torques or motions for the work piece in the test and counterpart test configurations, respectively;

a comparator element configured to compare the base and counterpart measurements, isolate common error therebetween and remove common error from the base measurements; and a determination element configured to determine the at least one physical characteristic of the work piece according to the base measurements having the common error removed.

16. The manipulation and testing system of claim 15 comprising the manipulator arm assembly, the work piece interface configured to grasp and hold the work piece while the manipulator arm assembly moves the work piece through the test and counterpart test configurations.

17. The manipulation and testing system of claim 15, wherein the manipulator arm assembly includes an effector assembly interposed between the work piece and the remainder of the manipulator arm assembly, and the effector assembly includes the sensor suite.

18. The manipulation and testing system of claim 15, wherein the test scheme module includes:

a center of mass test scheme having at least two test configurations including different orientations of the work piece;

a moment of inertia test scheme having at least one test configuration including orientation of the work piece along a specified axis and rotation of the work piece around the specified axis; and a center of mass and moment of inertia test scheme having at least two test configurations including orientations of the work piece along at least two specified axes and rotation of the work piece around each of the specified axes.

19. The manipulation and testing system of claim 15, wherein the one or more counterpart test configurations include one or more reverse load configurations of the load reversal scheme that are inverse to the respective one or more test configurations of the selected at least one test scheme.

20. The manipulation and testing system of claim 19, wherein the comparator element is configured to remove common error from the base measurements including coupled signal components of the base measurements and opposed coupled signal components of the counterpart measurements.

21. The manipulation and testing system of claim 15, wherein the comparator element is configured to compare the base and counterpart measurements, isolate common error between the base and counterpart measurements including one or more of creep error of sensors at the sensor suite, cross talk between sensor elements of the sensors, alignment error or concentricity.

22. The manipulation and testing system of claim 15 comprising at least one calibration unit approximating a profile and mass of the work piece; and the error isolation module includes:

a calibration scheme including one or more calibration configurations for the calibration unit, the one or more calibration configurations correspond to the one or more test configurations of the at least one test scheme.

23. The manipulation and testing system of claim 22, wherein the implementing element is configured to move the calibration unit through the one or more calibration configurations of the calibration scheme;

the measurement element is configured to collect calibration measurements including one or more of calibration force, torque, or motion for the calibration unit in the one or more calibration configurations;

the comparator element is configured to compare the base and calibration measurements, isolate common creep error therebetween and remove common creep error from the base measurements; and the determination element is configured to determine the at least one physical characteristic of the work piece according to the base measurements having the common creep error removed.

24. The manipulation and testing system of claim 22, wherein the calibration unit includes another work piece, and the calibration scheme and one or more calibration configurations match the selected at least one test scheme and the one or more test configurations.

25. The manipulation and testing system of claim 15 comprising an adjustable ballast system coupled with one or more of the manipulator arm assembly or the work piece, the adjustable ballast system includes:

a sensor interface coupled with the sensor suite;

at least one rail extending away from the sensor suite; and a counter ballast slidably coupled along the at least one rail, the counter ballast movable toward and away from the sensor suite along the at least one rail, and the counter ballast and the work piece are components of a composite assembly.

26. The manipulation and testing system of claim 25, wherein the error isolation module includes:

a counter ballast scheme configured to move the counter ballast relative to the sensor suite and align a center of mass of the composite assembly with a sensing plane of the sensor suite.

27. The manipulation and testing system of claim 25, wherein the adjustable ballast system includes a ballast actuator coupled with one or more of the counter ballast or the at least one rail, and the ballast actuator is configured to move the counter according to the counter ballast scheme.

* * * * *